US008533614B2

(12) United States Patent  
Katsumata

(10) Patent No.: US 8,533,614 B2  
(45) Date of Patent: Sep. 10, 2013

(54) SCREEN EDITING DEVICE, SCREEN EDITING METHOD, AND COMPUTER PROGRAM PRODUCT

(75) Inventor: Motoyuki Katsumata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 784 days.

(21) Appl. No.: 12/189,283

(22) Filed: Aug. 11, 2008

(65) Prior Publication Data

US 2009/0055764 A1 Feb. 26, 2009

(30) Foreign Application Priority Data

Aug. 20, 2007 (JP) ................... 2007-213465

(51) Int. Cl.
*G06F 3/048* (2013.01)
(52) U.S. Cl.
USPC .......................................... 715/762; 715/763
(58) Field of Classification Search
USPC ................................................. 715/762, 763
See application file for complete search history.

(56) References Cited

U.S. PATENT DOCUMENTS

| | | | | |
|---|---|---|---|---|
| 5,555,370 | A | * | 9/1996 | Li et al. ........................ 715/763 |
| 6,920,607 | B1 | * | 7/2005 | Ali et al. ....................... 715/206 |
| 7,509,303 | B1 | * | 3/2009 | Chen ...................................... 1/1 |
| 2002/0198876 | A1 | * | 12/2002 | Zielinski et al. .................. 707/4 |
| 2006/0050142 | A1 | * | 3/2006 | Scott et al. ................ 348/14.05 |
| 2006/0095856 | A1 | * | 5/2006 | Sugiyama ..................... 715/762 |
| 2008/0288877 | A1 | * | 11/2008 | Latzina et al. ................ 715/762 |
| 2010/0011305 | A1 | * | 1/2010 | Ullom et al. .................. 715/762 |

FOREIGN PATENT DOCUMENTS

| | | |
|---|---|---|
| JP | 3-116285 | 5/1991 |
| JP | 2003-005825 | 1/2003 |
| JP | 2003-150971 | 5/2003 |
| JP | 2005-045370 | 2/2005 |
| JP | 2006-129398 | 5/2006 |
| JP | 2006-189920 | 7/2006 |
| JP | 2006-260085 | 9/2006 |
| JP | 2007-048309 | 2/2007 |

OTHER PUBLICATIONS

Japanese Office Action dated Oct. 11, 2011.

* cited by examiner

*Primary Examiner* — Robert Stevens
*Assistant Examiner* — Anil Bhargava
(74) *Attorney, Agent, or Firm* — IPUSA, PLLC

(57) ABSTRACT

An image editing device configured to edit the contents of an operations screen to be displayed on a display and store a result of editing, the image editing device includes a keyword storing part configured to store at least one keyword corresponding to each screen structural element which can be arranged on the operations screen; a selection receiving part configured to select the screen structural element of an editing subject; a display setting part configured to determine whether the screen structural element selected by the selection receiving part is to be displayed on the operations screen; a keyword receiving part configured to receive an input of the keyword; and a first extraction part configured to extract the screen structural element corresponding to the keyword received by the keyword receiving part and display the screen structural element as a candidate screen structural element for display-setting.

15 Claims, 31 Drawing Sheets

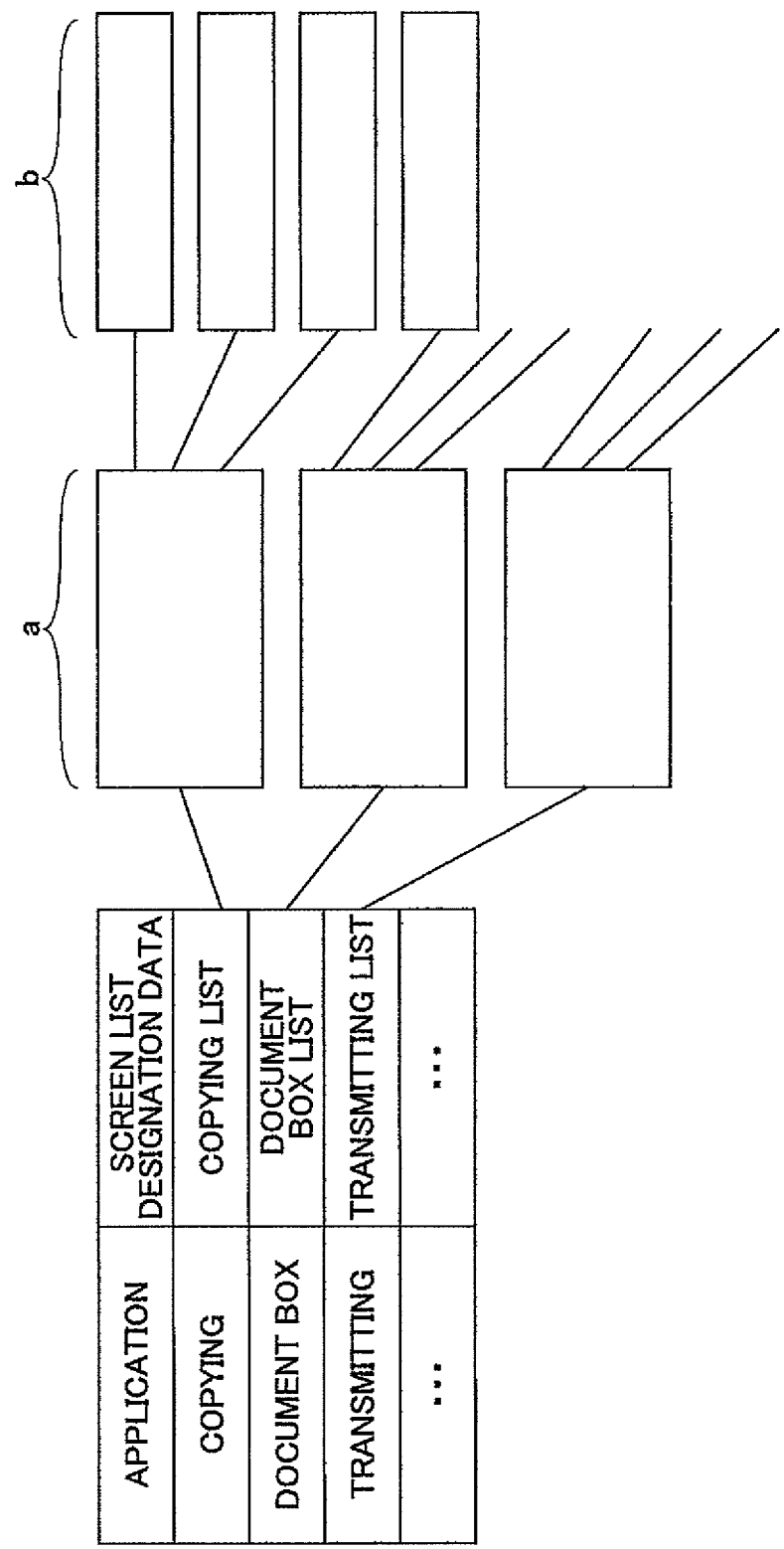

FIG.4

| SCREEN | SCREEN DEFINITION DATA |
|---|---|
| COPY TOP SCREEN | COPY TOP SCREEN DEFINITION DATA |
| SELECTION SCREEN OF KINDS OF MANUSCRIPTS | SELECTION SCREEN OF KINDS OF MANUSCRIPT DEFINITION DATA |
| VARIABLE MAGNIFICATION SCREEN | VARIABLE MAGNIFICATION SCREEN DEFINITION DATA |
| ... | ... |

| SCREEN | SCREEN DEFINITION DATA |
|---|---|
| DOCUMENT SELECTION SCREEN | DOCUMENT SELECTION SCREEN DEFINITION DATA |
| MANUSCRIPT READING SCREEN | MANUSCRIPT READING SCREEN DEFINITION DATA |
| PRINTING SCREEN | PRINTING SCREEN DEFINITION DATA |
| ... | ... |

| SCREEN | SCREEN DEFINITION DATA |
|---|---|
| TRANSMISSION TOP SCREEN | TRANSMISSION TOP SCREEN DEFINITION DATA |
| SETTING SCREEN OF KINDS OF MANUSCRIPTS | SETTING SCREEN OF KINDS OF MANUSCRIPTS DEFINITION DATA |
| RESOLUTION SETTING SCREEN | RESOLUTION SETTING SCREEN DEFINITION DATA |
| ... | ... |

FIG.5

| IDENTIFIER | CLASSIFICATION | ... | KEYWORD ID |
|---|---|---|---|
| ID_B_AUTO_COLOR | BUTTON | ... | KEY_ID_001 |
| ID_B_FULL_COLOR | BUTTON | ... | KEY_ID_002 |
| ID_B_MONOCHROME | BUTTON | ... | KEY_ID_003 |
| ID_B_TWIN_COLOR | BUTTON | ... | KEY_ID_004 |
| ... | ... | ... | ... |

| IDENTIFIER | CLASSIFICATION | ... | KEYWORD ID |
|---|---|---|---|
| ... | ... | ... | ... |

| IDENTIFIER | CLASSIFICATION | ... | KEYWORD ID |
|---|---|---|---|
| ... | ... | ... | ... |

| IDENTIFIER | CLASSIFICATION | ... | KEYWORD ID |
|---|---|---|---|
| ... | ... | ... | ... |

FIG.6

| IDENTIFIER | CLASSIFICATION | COORDINATE | SIZE | FORM | FONT SIZE | DISPLAY? | KEYWORD ID |
|---|---|---|---|---|---|---|---|
| ID_B_AUTO_COLOR | BUTTON | (9,106) | (70,32) | buttonA.bmp | 16pt | DISPLAY | KEY_ID_001 |
| ID_B_FULL_COLOR | BUTTON | (83,106) | (70,32) | buttonA.bmp | 16pt | DISPLAY | KEY_ID_002 |
| ID_B_MONOCHROME | BUTTON | (9,141) | (144,32) | buttonB.bmp | 16pt | DISPLAY | KEY_ID_003 |
| ID_B_TWIN_COLOR | BUTTON | (9,177) | (70,32) | buttonD.bmp | 16pt | DISPLAY | KEY_ID_004 |
| ID_B_SINGLE_COLOR | BUTTON | (83,177) | (70,32) | buttonD.bmp | 16pt | DISPLAY | KEY_ID_005 |
| ID_M_FIRST_LINE | MESSAGE | (161,149) | (445,22) | - | 24pt | DISPLAY | KEY_ID_006 |
| ID_M_SECOND_LINE | MESSAGE | (161,179) | (445,16) | - | 16pt | DISPLAY | KEY_ID_007 |
| ID_B_APS | BUTTON | (169,105) | (76,80) | buttonC.bmp | 16pt | DISPLAY | KEY_ID_008 |
| ID_B_FIRST_STEP | BUTTON | (247,105) | (76,80) | buttonC.bmp | 24pt | DISPLAY | KEY_ID_009 |
| ID_B_SECOND_STEP | BUTTON | (325,105) | (76,80) | buttonC.bmp | 24pt | DISPLAY | KEY_ID_010 |
| ID_B_THIRD_STEP | BUTTON | (403,105) | (76,80) | buttonC.bmp | 24pt | DISPLAY | KEY_ID_011 |
| ... | ... | (x,y) | (w,h) | ... | ... | ... | ... |

COPY TOP SCREEN

FIG.8

| KEYWORD ID | KEYWORD |
|---|---|
| KEY_ID_001 | 自動カラー選択 |
| KEY_ID_002 | フルカラー |
| KEY_ID_003 | 白黒 |
| KEY_ID_004 | 2色 |
| KEY_ID_005 | 単色 |
| KEY_ID_006 | ステータスメッセージ |
| KEY_ID_007 | ステータスメッセージ |
| KEY_ID_008 | 自動用紙選択 |
| KEY_ID_009 | 給紙段1段目 |
| KEY_ID_010 | 給紙段2段目 |
| KEY_ID_011 | 給紙段3段目 |
| ... | ... |

FIG.9

| KEYWORD ID | KEYWORD |
|---|---|
| KEY_ID_001 | AUTO COLOR SELECT |
| KEY_ID_002 | FULL COLOR |
| KEY_ID_003 | BLACK & WHITE |
| KEY_ID_004 | TWO COLOR |
| KEY_ID_005 | SINGLE COLOR |
| KEY_ID_006 | STATUS MESSAGE |
| KEY_ID_007 | STATUS MESSAGE |
| KEY_ID_008 | AUTO PAPER SELECT |
| KEY_ID_009 | TRAY 1 |
| KEY_ID_010 | TRAY 2 |
| KEY_ID_011 | TRAY 3 |
| ... | ... |

FIG.10

| SCREEN STRUCTURAL ELEMENT IDENTIFIER | NAME 1 | NAME 2 |
|---|---|---|
| ID_B_AUTO_COLOR | コピートップ画面 | 自動カラー選択 |
| ID_B_FULL_COLOR | コピートップ画面 | フルカラー |
| ID_B_MONOCHROME | コピートップ画面 | 白黒 |
| ID_B_TWIN_COLOR | コピートップ画面 | 2色 |
| ... | ... | ... |

FIG.11

| SCREEN STRUCTURAL ELEMENT IDENTIFIER | NAME 1 | NAME 2 |
|---|---|---|
| ID_B_AUTO_COLOR | COPY TOP SCREEN | AUTO COLOR SELECT |
| ID_B_FULL_COLOR | COPY TOP SCREEN | FULL COLOR |
| ID_B_MONOCHROME | COPY TOP SCREEN | BLACK & WHITE |
| ID_B_TWIN_COLOR | COPY TOP SCREEN | TWO COLOR |
| ... | ... | ... |

FIG. 25

```xml
<window id="W_STAMP_DATE" function="COPY" shape="popup_window.bmp">
  <item id="M_STAMP_DATE_TTL" type="message" x=8 y=8 w=380 h=20 font=16 visible=true>
    <keyword kw1="KEY_ID_1001" kw2="KEY_ID_0101" kw3="KEY_ID_0011"/>
  </item>
  <item id="B_STAMP_DATE_OK" type="button" x=516 y=8 w=106 h=30 shape="ok.bmp" font=16 visible=true customize=false>
    <keyword kw1="KEY_ID_1001" kw2="KEY_ID_0101" kw3="KEY_ID_0011" kw4="KEY_ID_1111"/>
  </item>
  <item id="M_STAMP_DATE_GUIDE" type="message" x=8 y=43 w=400 h=20 font=16 visible=true>
    <keyword kw1="KEY_ID_1001" kw2="KEY_ID_0101" kw3="KEY_ID_0011"/>
  </item>
  <item id="B_STAMP_DATE_YELLOW" type="button" x=40 y=94 w=180 h=22 shape="pop_btn.bmp" font=16 visible=true>
    <keyword kw1="KEY_ID_1001" kw2="KEY_ID_0101" kw3="KEY_ID_0011" kw4="KEY_ID_1112"/>
  </item>
  <item id="B_STAMP_DATE_RED" type="button" x=224 y=94 w=180 h=22 shape="pop_btn.bmp" font=16 visible=true>
    <keyword kw1="KEY_ID_1001" kw2="KEY_ID_0101" kw3="KEY_ID_0011" kw4="KEY_ID_1113"/>
  </item>
  <item id="B_STAMP_DATE_CYAN" type="button" x=408 y=94 w=180 h=22 shape="pop_btn.bmp" font=16 visible=true>
    <keyword kw1="KEY_ID_1001" kw2="KEY_ID_0101" kw3="KEY_ID_0011" kw4="KEY_ID_1114"/>
  </item>
  <item id="B_STAMP_DATE_MAZENTA" type="button" x=40 y=140 w=180 h=22 shape="pop_btn.bmp" font=16 visible=true>
    <keyword kw1="KEY_ID_1001" kw2="KEY_ID_0101" kw3="KEY_ID_0011" kw4="KEY_ID_1115"/>
  </item>
  <item id="B_STAMP_DATE_GREEN" type="button" x=224 y=140 w=180 h=22 shape="pop_btn.bmp" font=16 visible=true>
    <keyword kw1="KEY_ID_1001" kw2="KEY_ID_0101" kw3="KEY_ID_0011" kw4="KEY_ID_1116"/>
  </item>
  <item id="B_STAMP_DATE_BLUE" type="button" x=408 y=140 w=180 h=22 shape="pop_btn.bmp" font=16 visible=true>
    <keyword kw1="KEY_ID_1001" kw2="KEY_ID_0101" kw3="KEY_ID_0011" kw4="KEY_ID_1117"/>
  </item>
  <item id="B_STAMP_DATE_BLACK" type="button" x=40 y=196 w=180 h=22 shape="pop_btn.bmp" font=16 visible=true>
    <keyword kw1="KEY_ID_1001" kw2="KEY_ID_0101" kw3="KEY_ID_0011" kw4="KEY_ID_1118"/>
  </item>
</window>
```

FIG.26

```
<message_list language="jp">
    <message id="KEY_ID_1001" string="PRINT"/>
    <message id="KEY_ID_0101" string="DATE PRINT"/>
    <message id="KEY_ID_0011" string="PRINT COLOR"/>
    <message id="KEY_ID_1111" string="OK"/>
    <message id="KEY_ID_1112" string="YELLOW"/>
    <message id="KEY_ID_1113" string="RED"/>
    <message id="KEY_ID_1114" string="CYAN"/>
    <message id="KEY_ID_1115" string="MAGENTA"/>
    <message id="KEY_ID_1116" string="GREEN"/>
    <message id="KEY_ID_1117" string="BLUE"/>
    <message id="KEY_ID_1118" string="BLACK"/>
</message_list>
```

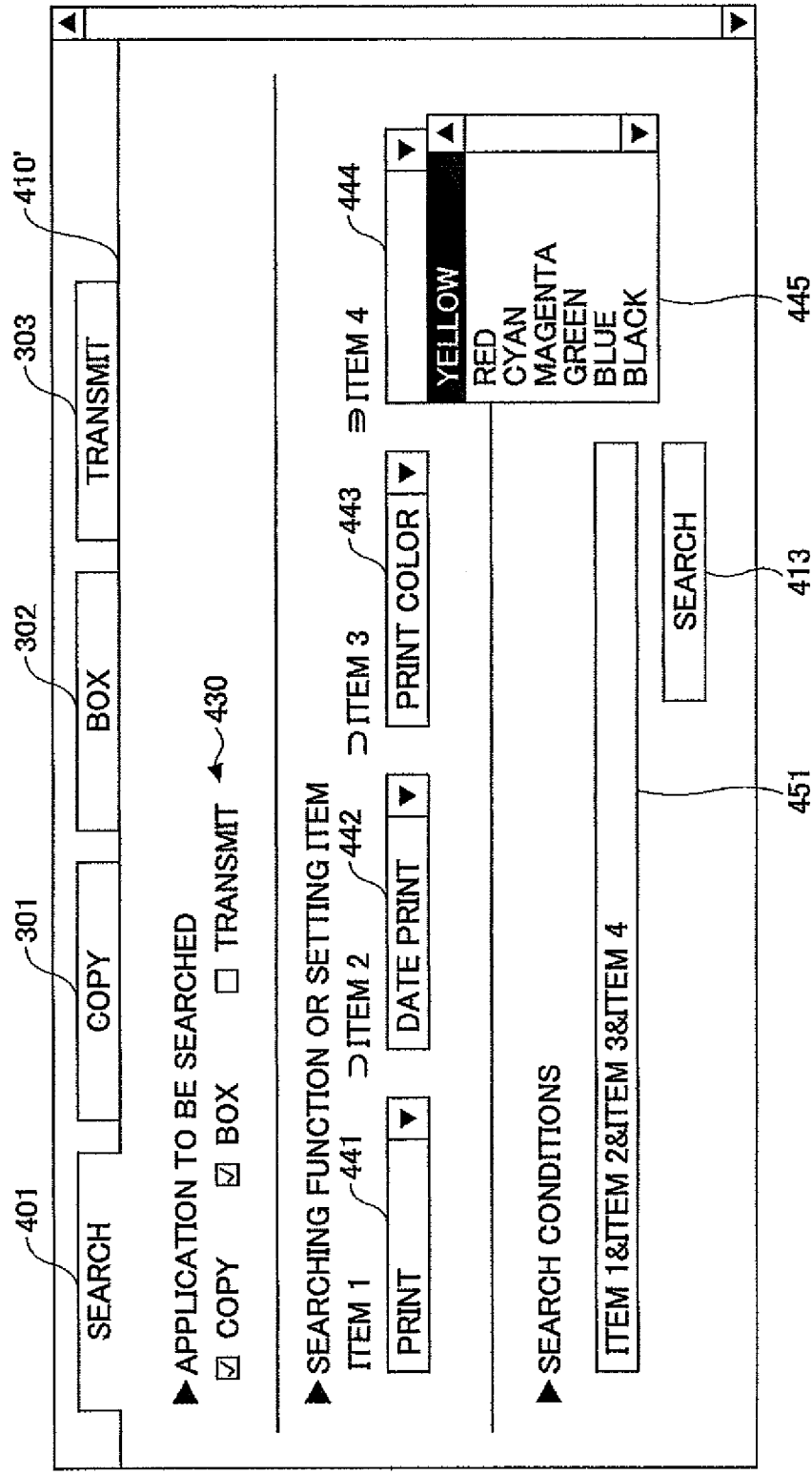

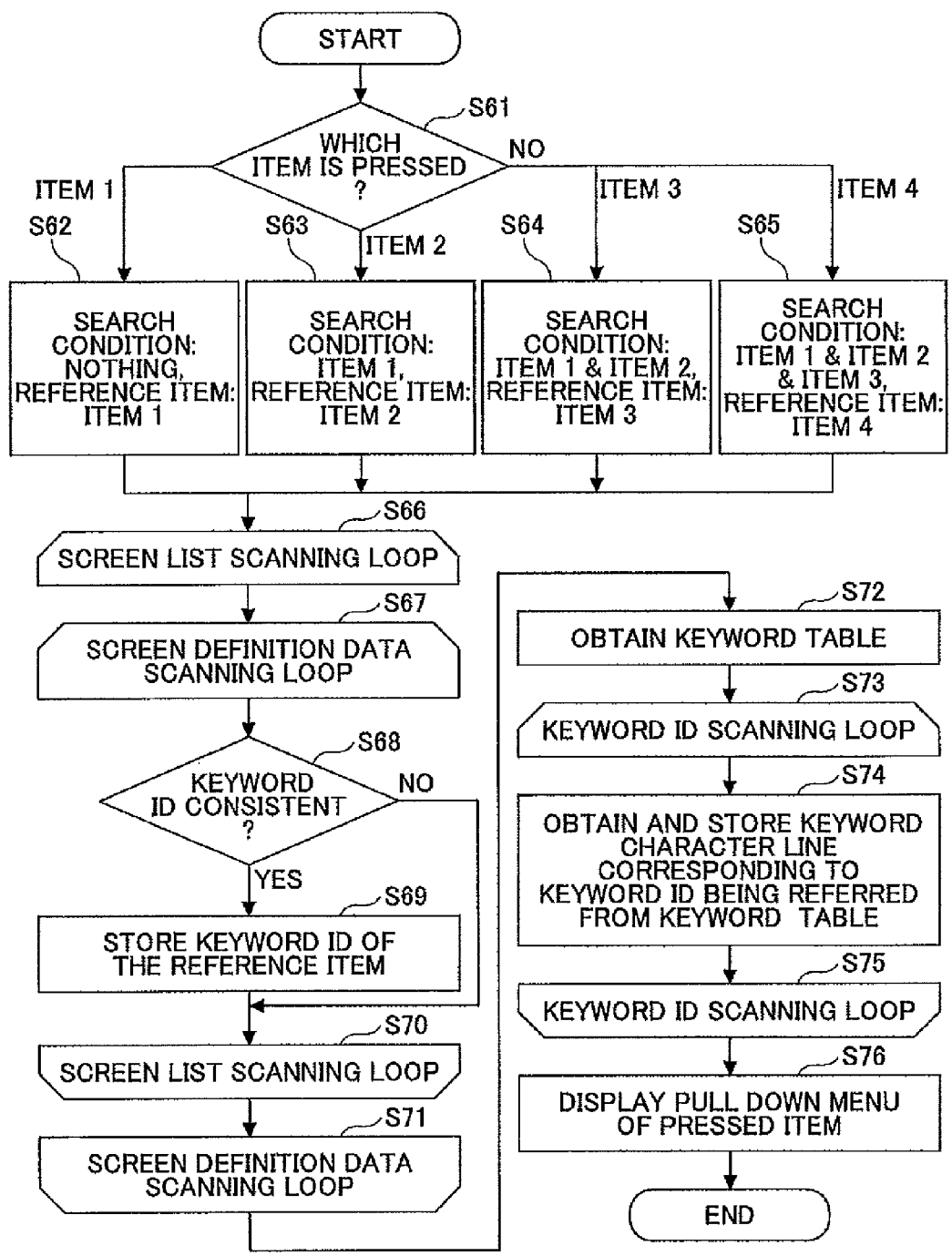

SCREEN EDITING DEVICE, SCREEN EDITING METHOD, AND COMPUTER PROGRAM PRODUCT

BACKGROUND OF THE INVENTION

1. Field of the Invention

The present invention generally relates to screen editing devices, screen editing methods, and computer program products for making computers function as the screen editing device.

More specifically, the present invention relates to a screen editing device configured to edit the contents of operations screens to be displayed on a display, a screen editing method for editing the contents of operations screens to be displayed on the display, and a computer program product for making a computer function as the screen editing device.

2. Description of the Related Art

Conventionally, an example where a GUI (Graphical User Interface) screen is displayed on a display and various data or receipt of operations are displayed in the GUI is known.

In addition, the GUI can be designed by arranging various components, such as a button for receiving the operations of a user or a character display frame for displaying contents that are set on the screen. Furthermore, in recent years, there are great demands for customization where the GUI provided by a maker is not used as it is and the user edits the contents of the screen so as to form the GUI consistent with a use of the user.

For example, inventions described in Japanese Laid-Open Patent Application Publication No. 2005-45370, Japanese Laid-Open Patent Application Publication No. 2003-150971, and Japanese Laid-Open Patent Application Publication No. 2003-5825 include techniques with respect to customization of the GUI.

Japanese Laid-Open Patent Application Publication No. 2005-45370 describes an image forming apparatus where display/non-display, position, size, or the like of a functional key in a display screen displayed in a liquid crystal display can be changed by selecting a panel customizing mode.

Japanese Laid-Open Patent Application Publication No. 2003-150971 describes a technique where access is made from a user terminal to a server so that an operations screen of an electronic device can be edited. In addition, Japanese Laid-Open Patent Application Publication No. 2003-150971 describes, as examples of editing, position change, synthesis, cutting, scaling of operations buttons, or deletion of functions of the operations buttons.

Japanese Laid-Open Patent Application Publication No. 2003-5825 describes industrial equipment whereby modification is made to an HTML file where a screen layout is set so that the GUI can be customized.

In the meantime, in a case where a maker of devices provides a customization function of the GUI, the needs of the user are assumed in advance so that a GUI consistent with the needs can be designed and provided as a template. However, if the needs of the user are not consistent with the template, it is necessary for the user to perform operations for changing the contents of the GUI, such as moving the position of the button or switching display/non-display. Because of this, in a case where the device includes various items and a large number of the GUI screens based on the items, a heavy workload may be imposed on the user to edit the screen to have desirable contents.

For example, in a case where the user wishes to prevent a single surface printing to avoid the waste of paper resources in a digital MFP (multi-functional processing) machine having functions as a copier, a printer or facsimile machine, this wish can be accomplished by customization of the GUI so as not to display buttons regarding the single surface printing. However, the buttons regarding the single printings are provided at several tens or several hundreds screens of the GUI. Accordingly, it takes a great deal of time to find all the buttons and set the buttons as non-display. Furthermore, it is difficult to set all the buttons regarding the single printing as non-display.

SUMMARY OF THE INVENTION

Accordingly, embodiments of the present invention may provide a novel and useful screen editing device, a screen editing method, and a computer program product for making a computer function as the screen editing device solving one or more of the problems discussed above.

More specifically, the embodiments of the present invention may provide a screen editing device and a screen editing method whereby in a case where a screen to be displayed on a display is edited, it is possible to efficiently find a portion to be edited by a user and improve efficiency of editing operations, and a computer program product for making a computer function as the screen editing device.

One aspect of the present invention may be to provide an image editing device configured to edit the contents of an operations screen to be displayed on a display and store a result of editing, the image editing device including: a keyword storing part configured to store at least one keyword corresponding to each screen structural element which can be arranged on the operations screen; a selection receiving part configured to select the screen structural element of an editing subject; a display setting part configured to determine whether the screen structural element selected by the selection receiving part is to be displayed on the operations screen; a keyword receiving part configured to receive an input of the keyword; and a first extraction part configured to extract the screen structural element corresponding to the keyword received by the keyword receiving part and display the screen structural element as a candidate screen structural element for display-setting.

Another aspect of the present invention may be to provide an image editing method where the contents of an operations screen to be displayed on a display are edited and a result of editing is stored, the image editing method including: a keyword storing step of storing at least one keyword corresponding to each screen structural element which can be arranged on the operations screen; a selection receiving step of selecting the screen structural element of an editing subject; a display setting step of determining whether the screen structural element selected in the selection receiving step is to be displayed on the operations screen; a keyword receiving step of receiving an input of the keyword; and a first extraction step of extracting the screen structural element corresponding to the keyword received by the keyword receiving part and displaying the screen structural element as a candidate screen structural element for display-setting.

Another aspect of the present invention may be to provide a computer program product having a program implemented by a computer, the program being used for an image editing method where the contents of an operations screen to be displayed on a display are edited and a result of editing is stored, the image editing method including: a keyword storing step of storing at least one keyword corresponding to each screen structural element which can be arranged on the operations screen; a selection receiving step of selecting the screen structural element of an editing subject; a display setting step of determining whether the screen structural element selected in the selection receiving step is to be displayed on the operations screen; a keyword receiving step of receiving an input of the keyword; and a first extraction step of extracting the screen structural element corresponding to the keyword received by the keyword receiving part and displaying the screen structural element as a candidate screen structural element for display-setting.

According to the screen editing device and the screen editing method of embodiments of the present invention, in a case where a screen to be displayed on a display is edited, it is possible to efficiently find a portion to be edited by a user and improve efficiency of editing operations. In addition, according to the computer program product of embodiments of the present invention, it is possible to cause the computer to perform as the screen editing device so that the above-mentioned effect can be achieved.

Other objects, features, and advantages of the present invention will become more apparent from the following detailed description when read in conjunction with the accompanying drawings.

BRIEF DESCRIPTION OF THE DRAWINGS

FIG. 3 is a view showing a structure of a data set defining contents of the GUI used by the image processing apparatus shown in FIG. 1;

FIG. 4 shows a part indicated by "a" (screen list data) in FIG. 3;

FIG. 5 shows a part indicated by "b" (screen definition data) in FIG. 3;

FIG. 6 is a table showing details of the contents of screen definition data shown in FIG. 3;

FIG. 8 shows an example of a keyword table used by an image editing device of an embodiment of the present invention;

FIG. 9 shows an another example of the keyword table;

FIG. 10 shows an example of a name table used by the image editing device of the embodiment of the present invention;

FIG. 11 shows an another example of the name table;

FIG. 25 is a view showing an example of screen definition data used in a second embodiment of the present invention;

FIG. 26 shows an example of a keyword table used in the second embodiment of the present invention;

FIG. 27 is a view showing an example a search display part displayed by a PC which is a screen editing device of a second embodiment of the present invention;

FIG. 28 is a flowchart of a displaying process of a pull-down menu of the search display part implemented by a CPU of the PC;

DETAILED DESCRIPTION OF THE PREFERRED EMBODIMENTS

A description is given below, with reference to the FIG. 1 through FIG. 29 of embodiments of the present invention.

As discussed below, a screen editing device of embodiments of the present invention is configured to edit the contents of operations screens displayed on a display of a certain apparatus. The screen editing device can be operated by providing a screen editing function in the apparatus configured to display the operations screens. The screen editing device may be operated by causing a computer, such as a PC (personal computer) which can communicate with a device configured to display the operations screen via a communication channel such as a network, execute a designated application program.

Furthermore, an editing function may be provided as an applications server by an apparatus configured to display the operations screen. The editing function can be used by accessing it from the PC or the like by a normal client application such as a Web browser. In addition, only data of the operations screen may be edited by a completely independent editing device, the data may be recorded in a recording medium, and the data of the screen may be read out from the recording medium to the device configured to display the operations screen.

In other words, hardware for operating a screen editing device includes a CPU, a ROM, a RAM, or the like and has certain computing capabilities.

Here, an embodiment is discussed where the screen editing device is operated by the PC and contents of the operations screens displayed on an image processing apparatus connected to the PC via a network are edited.

[First Embodiment of the Present Invention: FIG. 1 through FIG. 15]

Figure 1:
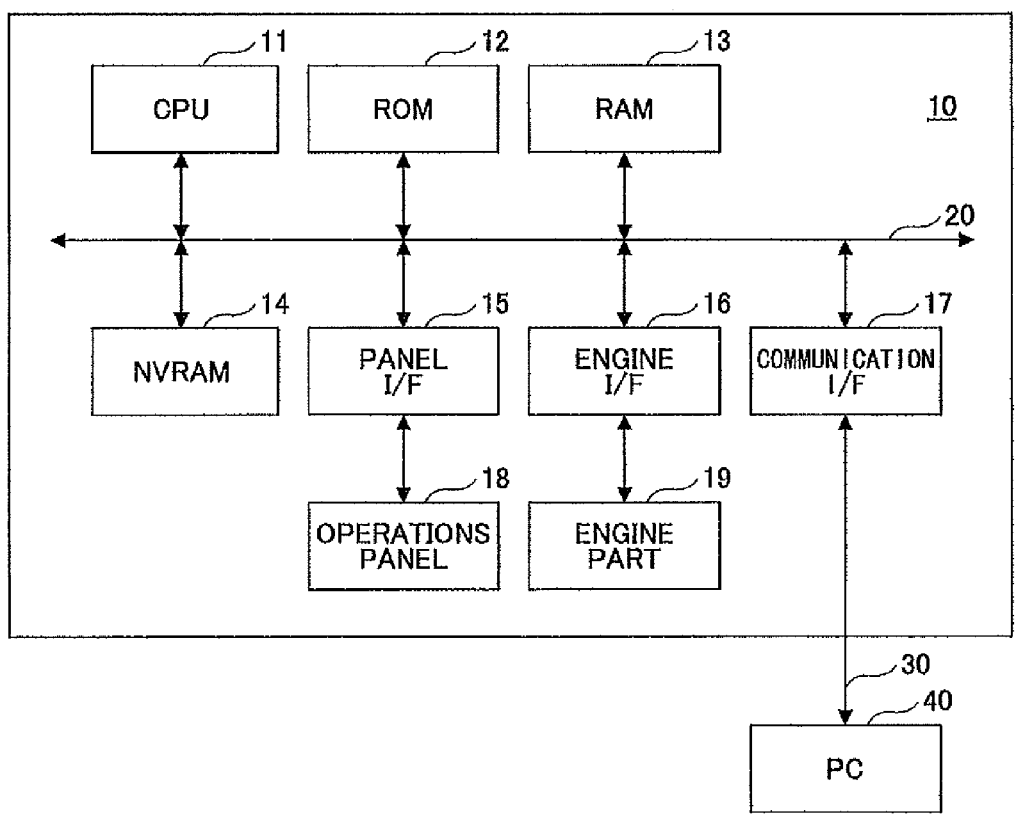
FIG. 1 is a block diagram showing a hardware structure of an image processing apparatus which is an example of an apparatus configured to show a screen based on screen data edited by a screen editing device of a first embodiment of the present invention.

FIG. 1 shows a hardware structure of an image processing apparatus configured to display an operations screen.

As shown in FIG. 1, an image processing apparatus 10 includes an engine part 19 and a communication interface (I/F) 17. The engine part 19 includes a printer engine, a scanner engine, an image storing HDD, and others. In the image processing apparatus 10, an application program is executed by a control part including a CPU 11, a ROM 12, and a RAM 13, so that the engine part 19 and the communication I/F 17 are controlled and thereby function as a printer, scanner, copier, document box, facsimile machine, and other devices. By adding an application program, it is possible to increase the number of kinds of functions that can be performed.

In addition, the image processing apparatus 10 includes an operations panel 18. The operations panel 18 is made by stacking a touch panel on a LCD (liquid crystal display). The GUI is displayed on the operations panel 18 so that an operation of a user such as setting or instructing is received and performed based on the contents of the operations. Among data such as settings necessary for these operations, data which are changeable and need to be held even if electric power is turned off are stored in an NVRAM (non-volatile RAM) 14.

The CPU 11, the ROM 12, the RAM 13, the NVRAM 14, and the communication I/F 17 are connected to each other by a system bus 20. The operations panel 18 is connected to the system bus 20 by a panel I/F 15. The engine part 19 is connected to the system bus 20 by an engine I/F 16. The communication I/F 17 can provide communications with a PC 40 via a network 30 such as a LAN (local area network). The PC 40 functions as a screen editing device of a first embodiment of the present invention. As communications, wired or wireless communications can be used and an optional communication channel can be used.

Figure 2:
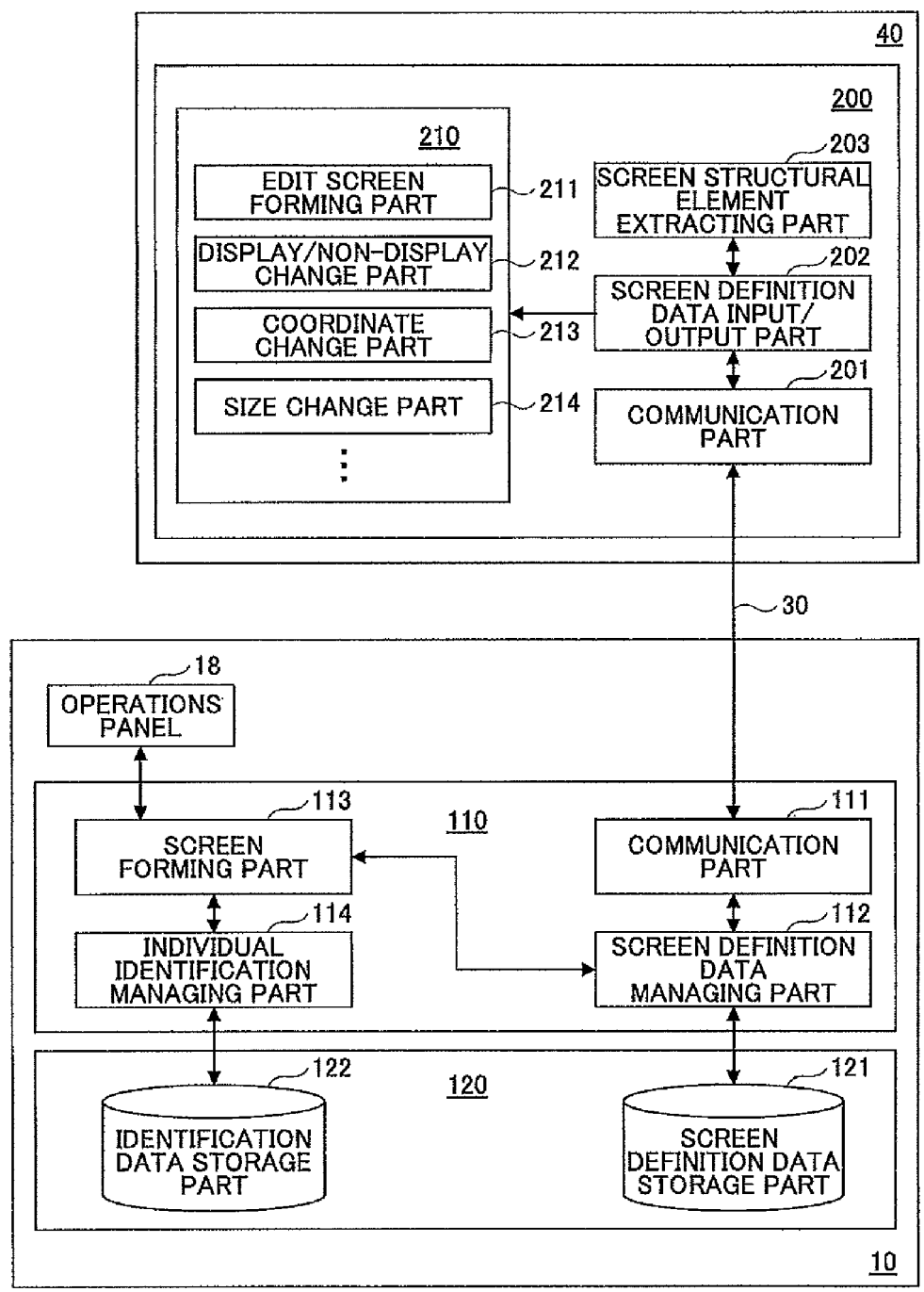
FIG. 2 is a functional block diagram showing structures of functions with respect to displaying and customizing a GUI in functions of a PC and the image processing apparatus shown in FIG. 1.

FIG. 2 shows functions with respect to display of the GUI and customization among the functions of the image processing apparatus 10 and the PC 40.

As shown in FIG. 2, the image processing apparatus 10 includes a control part 110 and a storage part 120.

The control part 110 includes a communication part 111, a screen definition data managing part 112, a screen forming part 113, and an individual identification managing part 114. The CPU 11 executes a designated program so that functions of the communication part 111, the screen definition data managing part 112, the screen forming part 113, and the individual identification managing part 114 are performed. The storage part 120 includes a screen definition data storage part 121 and an identification data storage part 122. Functions of the screen definition data storage part 121 and the identification data storage part 122 can be performed by the NVRAM 14.

The communication part 111 transmits and receives data to and from other devices or processes. For example, the communication part 111 communicates with the PC 40 so as to provide screen definition data to an UI customization tool 200 for editing. The UI customization tool 200 is configured to provide GUI editing functions. The screen definition data stored in the screen definition data storage part 121 is used for displaying the GUI in the image processing apparatus 10. The communication part 110 receives screen definition data edited by the UI customization tool 200 so as to store the data, as data used for displaying the GUI in the image processing device 10, in the screen definition data storage part 121. Furthermore, the communication part 111 is configured to receive instructions of a screen to be displayed on the operations panel 18 from an application using the GUI.

The screen definition data managing part 112 is configured to manage the data of the GUI stored by the screen definition data storage part 121. The screen definition data managing part 112 reads necessary data from the screen definition data storage part 121 in a case where the GUI is displayed or editing is performed. The screen definition data managing part 112 stores the screen definition data after editing is performed by the UI customization tool 200, in the screen definition data storage part 121. In a case where the GUI is displayed, the read screen definition data are provided to the screen forming part 113.

The screen forming part 113 forms, based on the screen definition data provided by the screen definition data managing part 112, screen data of the GUI used for displaying on the operations panel 18. The screen forming part 113 displays the GUI on the operations panel 18 based on the screen data. The screen definition data are stored in the screen definition data storage part 121 as data for indicating coordinates or configurations such as a button, message, icon, or a size. Accordingly, based on the data, the screen forming part 113 implements a process for rendering the message, the icon, or the like in a bit map of the display screen so as to form the screen data of the GUI.

The individual identification managing part 114 is configured to use identification data so as to identify the user who instructs displaying the screen. The identification data are, for example, a user ID, a password, or biometric information such as a fingerprint or a vein image. This identification is made by comparing identification data being input by the user and the identification data stored in the identification data storage part 122. The result of the identification can be used, for example, for determining allowance/non-allowance of use of the image processing apparatus 10 by the user or limitation of using functions by changing the GUI screen to be displayed by the user. Plural screen definition data sets regarding the same kinds of the GUI screen are prepared. For example, a GUI is displayed where a button for selecting a specific function is not displayed is displayed, when the specific user uses the image processing device 10. In this case, the user cannot use the function not displayed.

By using the above-mentioned functions, the image processing apparatus 10 can display the GUI corresponding to the screen definition data edited by the screen editing device on the operations panel 18 so that operations of the user can be received by the GUI.

When the CPU executes the designated application program, the PC 40 functions as the UI customization tool 200, which provides the user a function for editing the GUI screen displayed on the image processing apparatus 10.

The UI customization tool 200 includes a communication part 201, a screen definition data input/output part 202, a screen structural element extracting part 203, and a customization part 210.

The communication part 201 is configured to transmit and receive data from and to other devices or processes. The communication part 201 performs communication whereby access is made to the control part 110 so that the screen definition data indicating the contents of the GUI to be edited are obtained and the screen definition data after the editing are transmitted to the image processing apparatus 10 and are stored in the screen definition data storage part 121.

The screen definition data input/output part 202 obtains and stores necessary screen definition data from the image processing apparatus 10 via the communication part 201 when the instruction to edit the screen definition data is received from the user, so that change by the customization part 210 or search and extraction by the screen structural element extracting part 203 is performed. In addition, when instruction to store new or rewritten data is received from the user, the screen definition data input/output part 202 transmits the edited screen definition data to the image processing apparatus 10 via the communication part 201 so as to cause the image processing apparatus 10 to store the data.

The screen structural element extracting part 203 searches for and extracts the screen structural element corresponding to a keyword designated by the user from the edited screen definition data.

The customization part 210 includes parts configured to change the contents of the screen definition data, in addition to an edit screen forming part 211. The edit screen forming part 211 causes a display of the PC 40 to display a GUI editing screen so as to receive the editing operations or searching operations of the GUI, based on the screen definition data indicating the contents of the GUI being edited and stored by the screen definition data input/output part 202.

A display/non-display change part 212, a coordinate change part 213, and a size change part 214 shown in FIG. 2 correspond to the parts configured to change the contents of the screen definition data. Following instructions received by the GUI editing screen, the display/non-display change part 212, the coordinate change part 213, and the size change part 214 change values of properties with respect to the screen structural elements such as a button, message or icon contained in the GUI being edited among the screen definition data stored by the screen definition data input/output part 202.

The display/non-display change part 212 is configured to change the setting of display/non-display for determining whether the screen structural element is displayed by the GUI. The coordinate change part 213 is configured to change coordinates for defining where the screen structural element is provided on the GUI. The size change part 214 is configured to change a size for defining which size of the screen structural element is provided on the GUI. Other than the GUI editing screen, the display/non-display change part 212, the coordinate change part 213, and the size change part 214, change parts are provided for every property which can be changed and contained in the screen definition data.

Thus, the PC 40 can edit the contents of the GUI screen displayed on the operations panel 18 of the image processing apparatus 10 and store the result of editing in the image processing apparatus 10. The result of the editing may be stored in the PC 40.

Next, the screen definition data indicating the contents of the GUI and related data are discussed with reference to FIG. 3 through FIG. 6.

FIG. 3 is a view showing a structure of a data set defining the contents of the GUI used by the image processing apparatus 10. FIG. 4 shows a part indicated by "a" (screen list data) in FIG. 3 and FIG. 5 shows a part indicated by "b" (screen definition data) in FIG. 3.

As discussed above, the image processing apparatus 10 is configured to perform functions of copying, document box, or the like by applications. By optionally adding applications, functions can be added. Because of this, the screen list data for defining the set of the screen to be used by the application are stored for every application. The screen list designation data corresponding to the applications installed in the image processing apparatus 10 are prepared so that it can be understood which screen list data should be referred to in a case where the GUI of an application is displayed.

Reference data indicating positions of the screen definition data set defining the contents of the screen used by the application are prepared in each screen list data for every screen used by the application. The screen definition data set defines the contents of the GUI of one screen.

FIG. 6 is a table showing examples of the screen definition data.

In FIG. 6, data defining contents of the copy top screen which is a top screen used by the copy application are indicated. As shown in FIG. 6, the screen definition data include information of identifier, classification, coordinates, size, form, font size, display/non-display, and keyword ID of each screen structural element that can be provided in a specific screen.

The "identifier" is information used for specifying the screen structural element. The "identifier" is used for specifying codes implemented based on operations events of the button, selecting captions displayed on the GUI, designating a target of status change (non-selected/selected) on the GUI, or the like.

The "clarification" is information indicating properties of behavior of the screen structural element. Here, only one of operable "button", "message", and "icon" can be set. "Message" simply indicates a character line. "Icon" simply indicates an image.

"Coordinate" is information defining a display position of a screen structural element in a two-dimensional manner where the upper left of a display area of the GUI screen is a basic point.

"Size" is information defining width and height when the screen structural element is displayed on the GUI screen.

"Form" is information defining a file name of the image data used when the screen structural element is displayed on the GUI screen. The image data defined by "form" is stored in a designated folder in the image processing apparatus 10 in advance so as to be read when the GUI display is displayed. Because the image data are not used for displaying "message", there is no need to set the value of "form" for the screen structural element where "classification" is "message".

"Font size" is data for defining the caption displayed on the button or font size of a character line indicating as the message.

"Display/Non-Display" is data for defining whether the screen structural element is displayed on the GUI display. When the GUI screen is displayed on the operations panel 18, if the value of the "display/non-display" is "display", the corresponding screen structural element is provided on the GUI screen. If the value of the "display/non-display" is "non-display", the corresponding screen structural element is not provided on the GUI screen. Therefore, for example, if a certain button is "non-display", the user cannot perform operations using the button. Thus, specific operations or use of specific functions are not available to the user.

These data are used for display of the GUI screen.

Figure 7:
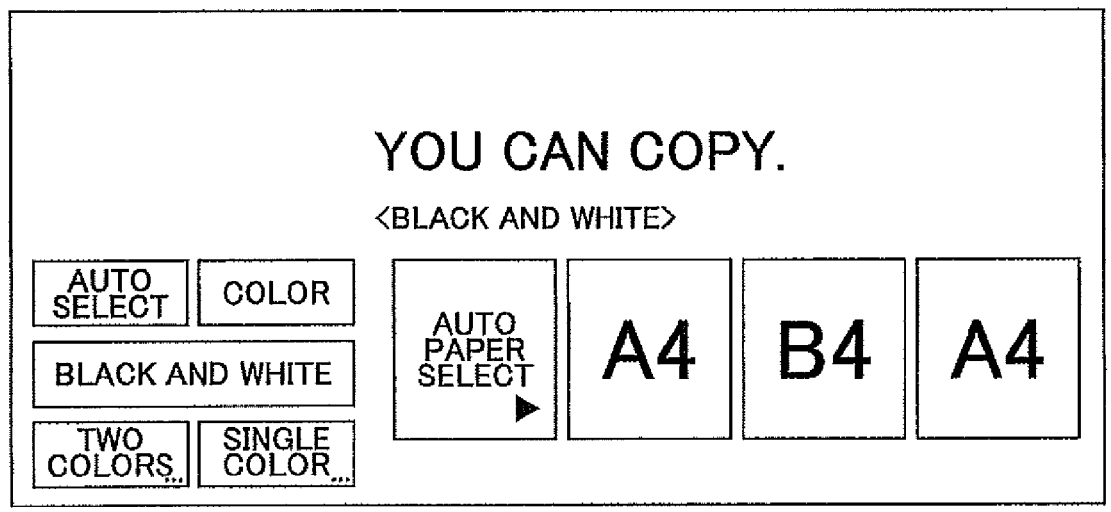
FIG. 7 is a view showing an example of a GUI screen displayed according to the screen definition data shown in FIG. 6.

FIG. 7 is a view showing an example of a GUI screen displayed according to the screen definition data shown in FIG. 6.

In the image processing apparatus 10, in order to display the GUI screen on the operations panel 18, based on these data, the image data for the GUI screen are formed in a display area of the GUI screen by the following process. That is, with respect to each screen structural element where the value of "display/non-display" is "display", image data of the file defined by "form" are modified to a size defined by "size" and provided in a position defined by "coordinate". In addition, caption registered in a caption table (not shown) prepared for every using language corresponding to "identifier" is rendered in a position defined by "coordinate" and "size" by a character of a size defined by a "font size".

Other than the above-mentioned case, the contents set in the image processing apparatus 10 may be dynamically displayed on the GUI. For example, sizes or a direction of papers provided on a tray are displayed on a button for selecting the paper-feeding tray. In this case, the image processing apparatus 10 specifies the screen structural element by the identifier so as to renew the display of the screen structural element if necessary.

"Keyword ID" shown in FIG. 4 is information indicating a keyword prepared by corresponding to the screen structural element in order to search for or extract the screen structural element during editing of the GUI. Here, in order to correspond to a switch of using language, only an ID of the keyword is indicated in the screen definition data. A keyword actually used for searching is stored in a different keyword table prepared for every language.

FIG. 8 and FIG. 9 show an example of the keyword table. More specifically, FIG. 8 is a Japanese language table and FIG. 9 is an English language table. Each table has keyword IDs and keyword character lines corresponding to the screen structural elements having the keyword IDs of the language. At this time, there is no problem even if the same keywords are provided to plural screen structural elements. By using the keyword, plural screen structural elements are extracted. In addition, when search for and extraction of the screen structural element are performed by following keywords designated by the user who is editing the GUI, a key word corresponding to each screen structural element is specified by following contents of the keyword table corresponding to a using language used for display by the user.

Since the keyword table is not used for display of the GUI screen, it is not necessary to store the keyword table in the image processing apparatus 10. However, if the keyword table is stored with the screen list data or the screen definition data, it is possible to read the table with the screen list data or the screen definition data when the PC 40 edits the GUI and easily manage the data.

These keyword IDs and keyword character lines are data indicating the keywords corresponding to the screen structural element which can be provided on the GUI screen. The screen definition data input/output part 202 configured to store these data at the time of editing the GUI screen correspond to a keyword storage part.

Separately from the above-mentioned keyword table, data indicating the name of each screen structural element are prepared as data used when the GUI is edited. This name is used for easily indicating the result of extraction by search using the keyword. In addition, this name is used for clearly indicating the selected screen structural element selected as the subject of editing by the user.

FIG. 10 and FIG. 11 show examples of name tables for storing the names. Names of the screen structural elements corresponding to screen structural element identifiers of the screen structural elements are described in the name tables. In each of examples of FIG. 10 and FIG. 11, two names can be registered. A name of a screen where the screen structural element is arranged is registered as the name 1. A name indicating a function of the screen structural element itself is registered as the name 2. The user can easily specify the screen structural element by the name 1 and name 2.

Names other than the name 1 and the name 2 can be used.

Although it is not preferable to register the same names for different screen structural elements in terms of the use of the name, unlike the keyword, it is not a problem technically that plural same names exist. In addition, the keyword and the name of each screen structural element may be the same or different.

The name table as well as the keyword table is prepared for every language. The table shown in FIG. 10 is for the Japanese language and the table shown in FIG. 11 is for the English language. Furthermore, the name table is not used for displaying the GUI screen itself. If the name table can be referred to by the PC 40, it is not necessary to store the name table as well as the keyword table in the image processing apparatus 10.

The contents of the screen list data, the contents of the "identifier" and "keyword IC" of the screen definition data, and the contents of the keyword tables and the name tables among the data shown in FIG. 3 through FIG. 6 and FIG. 8 through FIG. 11 are basically provided by a maker of the image processing apparatus 10. It is not necessary that the above-mentioned contents can be modified by the user. These data are data indicating the contents of the GUI that can be in the image processing apparatus 10 and the data indicating the screen structural elements that can be arranged in the GUI. These data may be modified in a case where the user can add a completely new and unique screen, button, or the like.

The screen used by a single application is hierarchically arranged as discussed below. The hierarchical structure may be accomplished by a process of the application. However, when the screen is edited, the screen can be easily selected if it is determined which screen belongs to which class. Accordingly, data indicating the hierarchical structure may be contained in the screen list data so that the data can be referred to at the time of editing.

Next, a display example of a GUI editing screen is shown in FIG. 10. The GUI editing screen is used for receiving editing operations of the GUI screen by the UI customization tool 200 of the PC 40.

Figure 12:
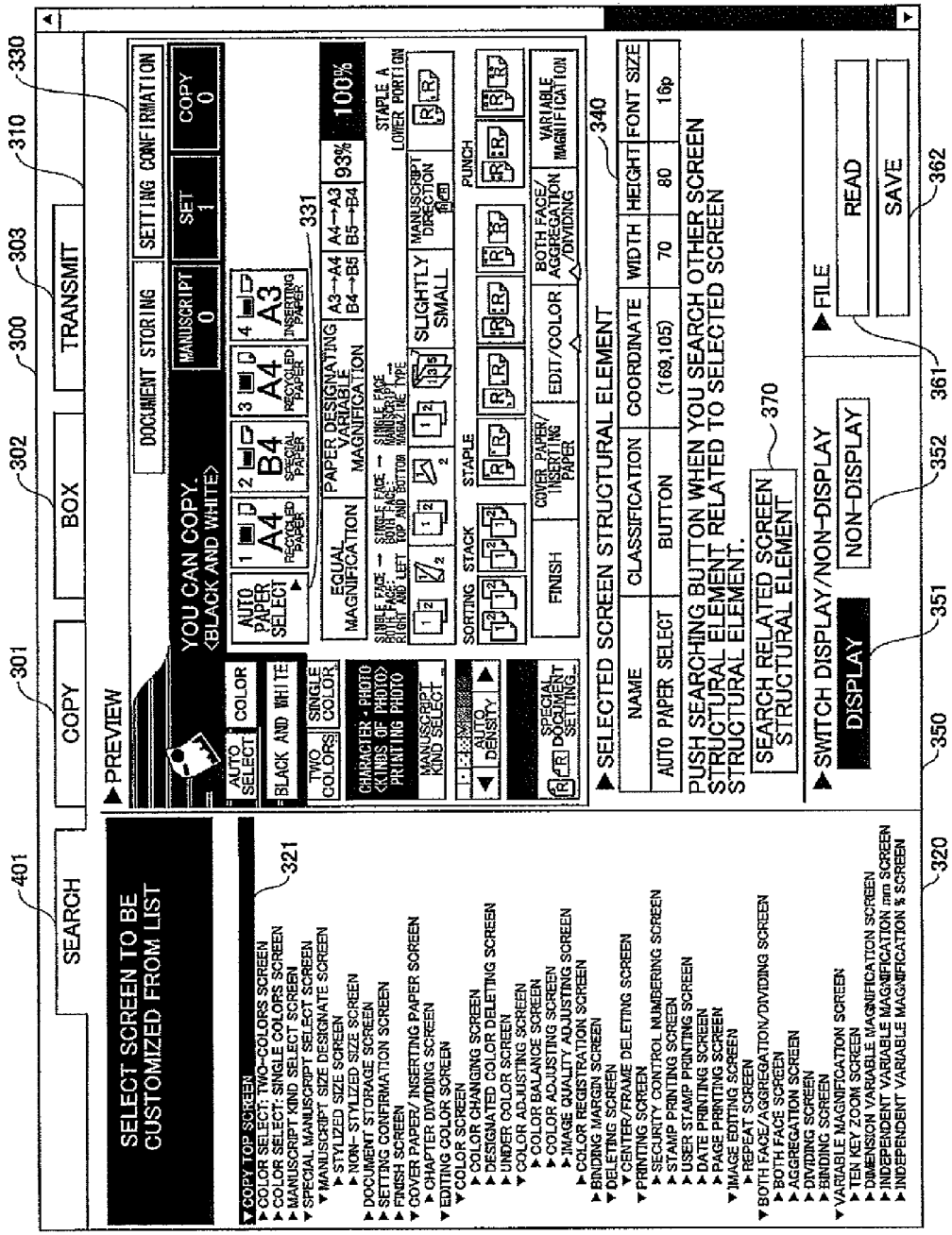
FIG. 12 is a view showing a GUI editing screen so that a UI customizing tool of the PC shown in FIG. 2 performs editing operations on the GUI screen.

A GUI editing screen 300 shown in FIG. 12 is displayed on the display of the PC 40 by functions of the UI customization tool 200 started on the PC 40. When a part where data to be edited are read is designated so that the UI customization tool 200 receives reading instructions, the UI customization tool 200 reads a data set shown in FIG. 3 from the part. Based on the contents of the data set, the GUI editing screen 300 shown in FIG. 12 is displayed. A display example when the data set is read from the image processing apparatus 10 is shown in FIG. 12.

On this screen, first, a selection, where the GUI is edited by which application of the image processing apparatus 10, is received by three tabs, a copy tab 301, a box tab 302, and a document transmitting tab 303. The tab displayed on the GUI editing screen 300 is determined based on data of the GUI used by which application are included in the data set obtained as an editing subject. In addition to the copy tab 301, the box tab 302, and the document transmitting tab 303, a search tab 401 is provided. The search tab 401 is a button for displaying a screen whereby instruction of search for and extraction of the screen structural element using the keyword is received.

FIG. 12 shows that the copy tab 301 is selected. With this selection, a screen for editing the GUI screen used by the copy application is displayed on an editing contents display part 310.

The screen list display part 320 displays a list of the GUI used by the application selected by the tab. In this list, a screen displayed at the time the application is started is regarded as a top level screen. A screen moved from the top level screen by operating buttons provided on the top level screen is regarded as a low level screen. A screen moved from the low level screen by operating buttons provided on the low level screen is regarded as a lower level screen. It is normal practice that the upper level screen is designed for receiving a wide set or functional selection and the lower level screen is designed for receiving a detailed set with respect to a specific function.

The user can select a single GUI screen which is a subject to be edited, from a list displayed on the screen list displaying part 302. Which GUI screen is selected is displayed by a cursor 321 and the contents of the selected GUI screen are displayed on a preview display part 330. FIG. 12 shows a copy top screen displayed at the top of the list.

A preview of the GUI screen displayed on the operations panel 18, where the editing result by the user is reflected, is displayed on the preview display part 330. In this screens selection can be made by clicking or the like the screen structural element such as a button where the display contents are expected to be edited.

Information indicating the present status of the screen structural element of an editing subject selected by the preview display part 330 is displayed on a property display part 340 and a display/non-display displaying part 350.

In FIG. 12 there is an auto paper select button 331. Information of a name, classification, coordinate, size (width and height) and a font size is displayed on the property display part 340 as present information regarding the button 331. Data items other than name among these data items indicate the contents of the screen definition data shown in FIG. 4. The user selects a desirable item and changes the value of each item by inputting a change instruction or a desirable value from a user interface not shown such as a text input, a pull-down menu, or cursor button.

Items not shown in FIG. 10 in the screen definition data or captions of each language can be displayed on the screen and edited. After the above-mentioned change is made, the contents are immediately reflected in a display of the preview display part 330. A name corresponding to the selected screen structural element is displayed based on the contents of the name table corresponding to the using language of the user who is editing. The value of the name cannot be edited. Due to limitation of the display space, the name of the screen is displayed on the screen list display part 320. Since there is no necessity to separately display it, only "name 2" on the name table is displayed.

In the display/non-display displaying part 350, a display button 351 and a non-display button 352 are displayed. The display button 351 and the non-display button 352 are used for setting a value of "display existence" with respect to the screen structural element of the editing subject. A button corresponding to the contents being set at present is reverse-displayed. In the example shown in FIG. 12, since the auto paper select button 331 is in a "display" mode, the display button 351 is in a reverse-display mode. By pressing the non-display button 352, the auto paper select button 331 can be set in the "non-display" mode. Change of this display/non-display is immediately reflected in the display of the preview display part 330.

If a certain button is set as "non-display", the button is not displayed on the preview display part 330 and therefore cannot be clicked on the screen. Because of this, regardless of display/non-display, a button is provided on the GUI editing screen 300, so as to display the list of the screen structural elements included in the data of the screen selected by the screen list display part 320. Hence, in a case where the user wishes to edit the information with respect to a non-displayed screen structural element, the user can select the editing subject from this list.

A saving button 362 receives instruction for saving the contents of the screen edited by the GUI editing screen 300. When the saving button 326 is pressed, the PC 40 saves the data set after editing in a portion designated by the user. If the image processing apparatus 10 is designated, the displayable data set can be saved. The data set can be saved at the PC 40 as a file.

The reading button 361 reads the data edited by the GUI editing screen 300 and receives the reading instruction. When the reading button 361 is pressed, the PC 40 reads the data set indicating the contents of the GUI screen from the part designated by the user, stores the data set as the editing subject, and renews the display of the GUI editing screen based on the contents.

Saving and reading can be done with a unit of the application, namely a unit of the image definition data indicated by single screen list data shown in FIG. 3.

Editing of the GUI screen is implemented in the editing contents display part 310 by reading a set of the screen definition data edited by pressing the reading button 361, by selecting the GUI screen of the editing subject by the screen list display part 320, by selecting, as the editing subject, the screen structural element whose display contents are changed by the preview display part 330, and by changing the properties of the screen structural element by the property display part 340 or the display/non-display displaying part 350.

In addition, a related element searching button 370 performs the search for and extraction of the screen structural element by using the keyword corresponding to the screen structural element of the editing subject and displays the result.

Figure 13:
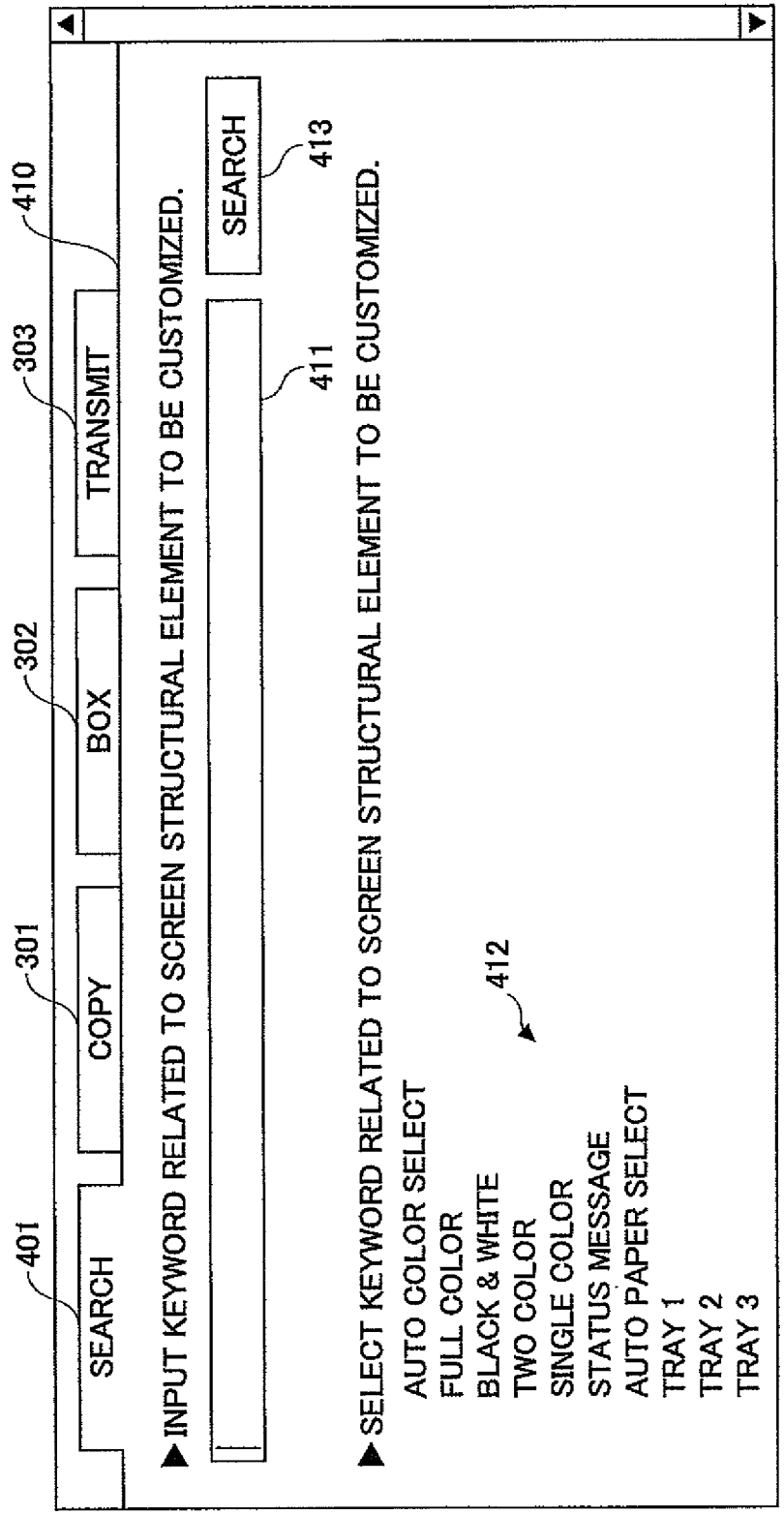
FIG. 13 is a view showing a display example of a screen for receiving search and extraction results of a screen structural element using a keyword by the UI customizing tool.

Next, an example of display of the screen for directing the search for and extraction of the screen structural element using the keyword is shown in FIG. 13. This screen is displayed based on selection of the search tab 401. When the search tab 401 is selected on the GUI editing screen 300, the PC 40 displays the search display part 410 in the GUI editing screen 300 as a display part corresponding to the search tab 401. Even in this status, the copy tab 301, the box tab 302, and the document transmitting tab 303 are displayed. By selecting these tabs, the user can display the editing contents display part shown in FIG. 10.

On the other hand, a keyword input part 411, a keyword list display part 412, and a search performing button 413 are provided in the search display part 410.

The keyword input part 411 receives input of the keyword to be used for searching. The keyword can be input in a text manner by the keyword input part 411. In addition, if the screen structural element of an editing subject is selected in the GUI editing screen 300 at the time when the search tab 401 is selected, the keyword corresponding to the screen structural element can be displayed as an initial value. Accordingly, even if the user does not know the corresponding keyword, it is possible to easily designate the keyword for searching for the screen structural element related to the screen structural element which is being edited.

If the GUI screen which is the editing subject is selected in the GUI editing screen 300 at the time when the searching tab 401 is selected, the keyword list display part 412 displays the keywords, as a list, corresponding to at least one of the screen structural elements that can be arranged in the screen. It the GUI screen which is the editing subject is not selected in the GUI editing screen 300 at the time when the searching tab 401 is selected, the keyword list display part 412 displays the keywords, as a list, corresponding to at least one of the screen structural elements that can be arranged in the top screen. By clicking any of the keywords included in the list, it is possible to input the clicked keyword to the keyword input part 411. Accordingly, even if the user does not know the proper keyword, it is possible to easily designate the keyword for searching for the screen structural element related to the screen structural element that can be arranged in the screen being edited.

In addition, the search performing button 413 receives instruction to start searching. When the search performing button 413 is pressed, the PC 40 searches all screen definition data included in the data set read as the editing subject. The PC 40 extracts the screen structural element corresponding to the keyword input to the keyword input part 411 so as to display the result on the screen.

If the related element search button 370 is pressed at the editing contents display part 310, the above-mentioned search display part 410 is not displayed. In this case, a search for and extraction of the screen structural element is performed by using the keyword corresponding to the screen structural element of the editing subject so that the result is displayed.

Figure 14:
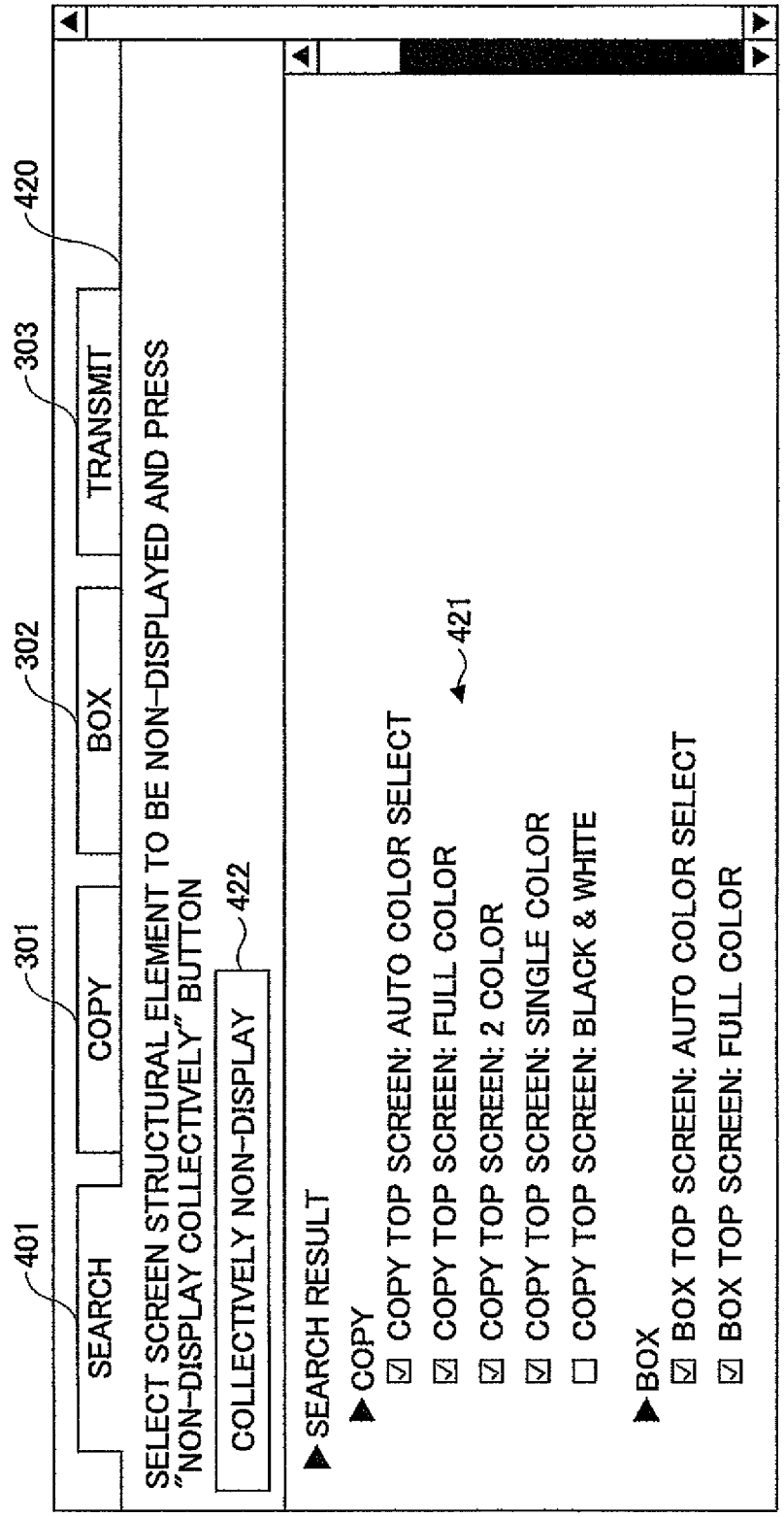
FIG. 14 is a view showing a display example of a screen indicating search result of the screen structural element using the keyword.

FIG. 14 shows an example of a screen which indicates the search result.

When a search button 413 is pressed, the display of the search display part 410 is switched to a search result display part 420 shown in FIG. 14 and displaying the search result of the screen structural element. When the related element search button 370 in the editing contents display part 310 is pressed, the display of the editing contents display part 310 is switched to the search result display part 420.

This screen includes an extraction list display part 421. The extraction list display part 421 displays, for every application, a list of the screen structural element corresponding to the key word the same as that used for the search. As a character line displaying each structural element, character lines of the name 1 and name 2 registered in the name tables corresponding to the using language of the user are used. By displaying the names and ":" sandwiched by the names, the user can ascertain which screen structural element provided at which screen is the extracted screen structural element.

In addition, the check box corresponding to each screen structural element is displayed in the list so that the user can select the screen structural element which is set to be non-displayed by a collective non-display button 422.

The collective non-display button 422 is used for collectively setting of non-display of the screen structural elements selected by the extraction list display part 421. When this button is pressed, the CPU of the PC 40 sets non-display of all screen structural elements whose check boxes are checked in the extraction list display part 421. Hence, even if the screen structural elements such as the buttons related to a specific keyword are provided in various screens, it is possible to easily set these elements to be non-displayed without causing errors.

When the maker prepares the keywords, the same keywords are provided for the screen structural elements related to the same functions. This means that it is possible to easily set a button related to the specific function to be non-displayed without causing errors. In addition, in a case where the use of specific functions is prevented by making the button non-displayed on the GUI, it is extremely useful to easily set the button related to the specific function to be non-displayed without causing errors.

In the search by the related element search button 370, it is possible to search for the screen structural element where the keyword which is the same as the screen structural element being edited is related by one-touch. Hence, it is possible to efficiently extract the screen structural element to be expected to be edited simultaneously with the screen structural element to be edited.

In the search result display part 420, the following button may be provided. That is, by using the button, the screen structural elements selected by the extraction list display part 421 can be displayed collectively. The button may be used for checking or non-checking all check boxes in the extraction list display part 421.

Next, a process is discussed for performing a function regarding extraction of the screen structural elements discussed above, which is a process implemented by the CPU of the PC 40. The CPU of the PC 40 executes an application program for performing the function of the UI customization tool 200 so that the process discussed below is performed.

Figure 15:
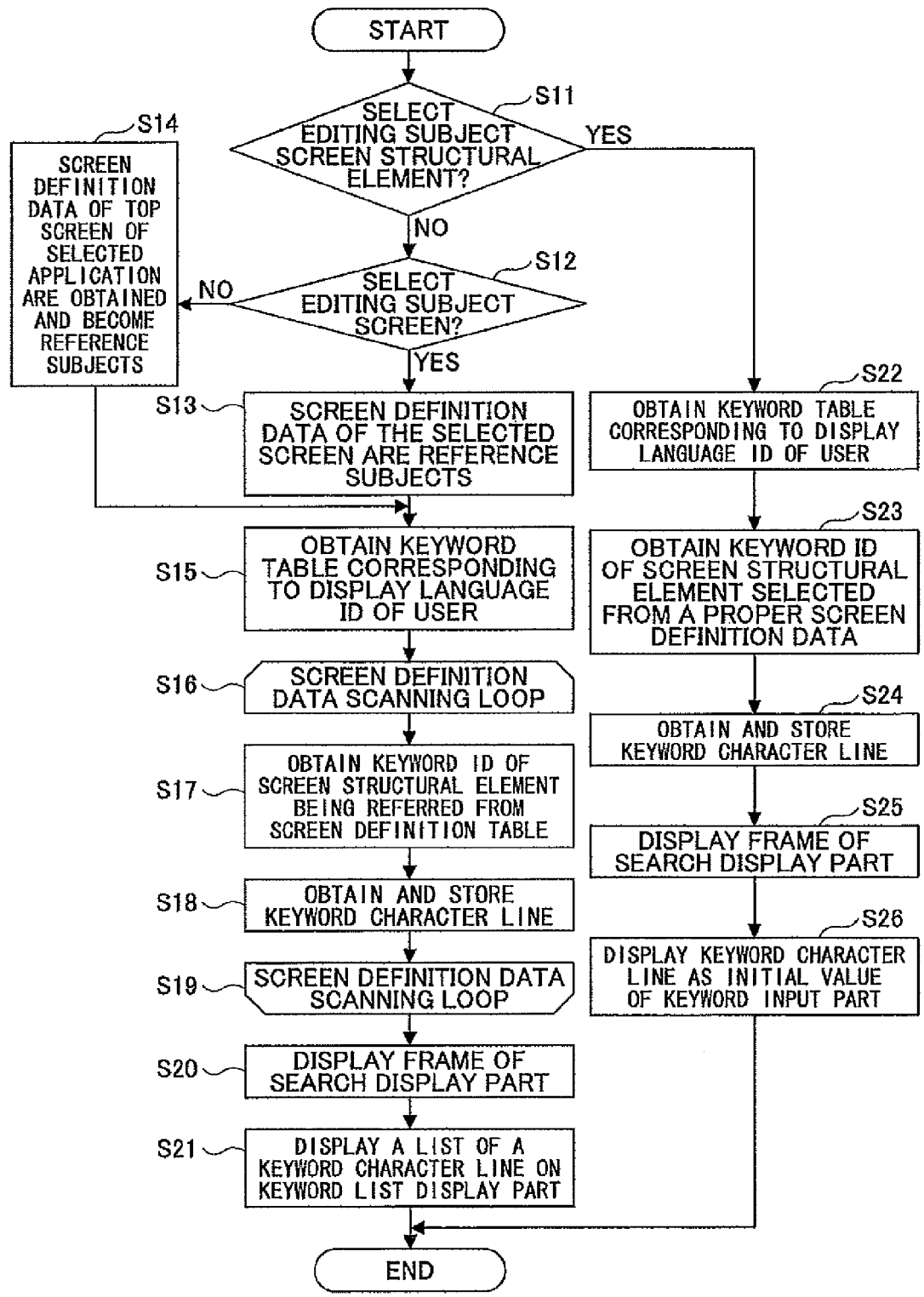
FIG. 15 is a flowchart of a displaying process of a search display part shown in FIG. 13 and implemented by a CPU of the PC shown in FIG. 2.

FIG. 15 shows a flowchart of a displaying process of the search display part 410 shown in FIG. 13. This process is implemented when the search tab 401 shown in FIG. 12 is selected.

First, in step S11, the CPU of the PC 40 determines whether the screen structural element of the editing subject is selected in the editing contents display part 310 displayed when the search tab 401 is selected. If this is not selected, the process goes to step S12 in order to collect data necessary for displaying the keyword list to be displayed on the keyword list display part 412.

In step S12, whether the screen of the editing subject is selected in the editing contents display part 310 is determined. If the screen is selected, the process goes to step S13 so that the screen definition data of the selected screen are reference subjects. If the screen of the editing subject is not selected in the editing contents display part 310, the process goes to step S14 so that screen definition data of the top screen of the selected application are obtained and become reference subjects.

In either case, the process goes to step S15 so that keyword tables shown in FIG. 6 and FIG. 7, which correspond to display language ID of the user who is editing are obtained. The display language is an ID indicating a language used for displaying the screen in the UI customization tool 200. The display language ID can be determined by following information of use language included in the user information or setting of the use language by the user.

After step S15, a screen definition data scanning loop of step S16 through step S19 is repeated until all screen structural definition data are referred to by referring to the screen structural elements included in the screen definition data which are the reference subjects in step S13 and step S14 one by one. In other words, a keyword ID corresponding to each screen structural element registered in the screen definition table which is the reference subject is obtained in step S17. By using the keyword ID obtained in step S17 as a key, a corresponding keyword character line is obtained from a keyword table obtained in step S15 and stored in step S18.

After that, the process goes to step S20 so that a frame of the search display part 410 shown in FIG. 13 is displayed on the GUI editing screen. A fixed display regardless of the contents of the keyword other than the keyword list display part 412 of the search display part 410 is made by this frame. In step S21, a list of a keyword character line held in step S18 is displayed on the keyword list display part 412 so that the process is completed.

On the other hand, if the screen structural element of the editing subject is selected in step S11, the process goes to step S22 in order to obtain a keyword character line that should be an initial value of a keyword displayed on the keyword input part of the search display part 410.

In this case, in step S22 as well as step S15, a keyword table corresponding to the display language ID of the user who is editing is obtained. In step S23, a keyword ID of the screen structural element selected as the editing subject is obtained from proper screen definition data. After that, in step S24 as well as step S18, a keyword character line corresponding to the keyword ID is obtained from a keyword table and stored.

In step S25 as well as step S20, the frame of the search display part 410 is displayed. In step S26, a keyword character line held in step S24 is displayed as an initial value of the keyword input part 411 and the process is completed. In this case, nothing may be displayed on the keyword list display part 412.

By the above-discussed process, corresponding to pressing the related element search button 370, the PC 40 displays the search display part 410 on the GUI editing screen 300 so that a keyword used for searching can be input.

In this case, if the editing subject GUI screen is selected in the editing contents display part 310, a keyword corresponding to at least one of the screen structural elements that can be arranged on the screen can be displayed on the keyword list display part 412 as a candidate of the keyword used for searching. In addition, if the editing subject screen structural element is selected in the editing contents display part 310, a keyword corresponding to the screen structural element can be displayed on the keyword input part 411 as a candidate of the keyword used for searching. In addition, as the keyword, a keyword of a language used in editing can be displayed.

In the process shown in FIG. 15, if YES is determined in step S11, the process for displaying the keyword list is not implemented. In this case, the process of the screen definition data scanning loop may be implemented where the screen definition data table of the screen selected as the editing subject is used as the reference subject, so that the keyword list may be displayed. In addition, if "YES" is determined in step S11, the search display part 410 may not be displayed and a searching process discussed below and using the keyword character line stored in step S24 may be implemented so that the search result display part 420 may be displayed.

Figure 16:
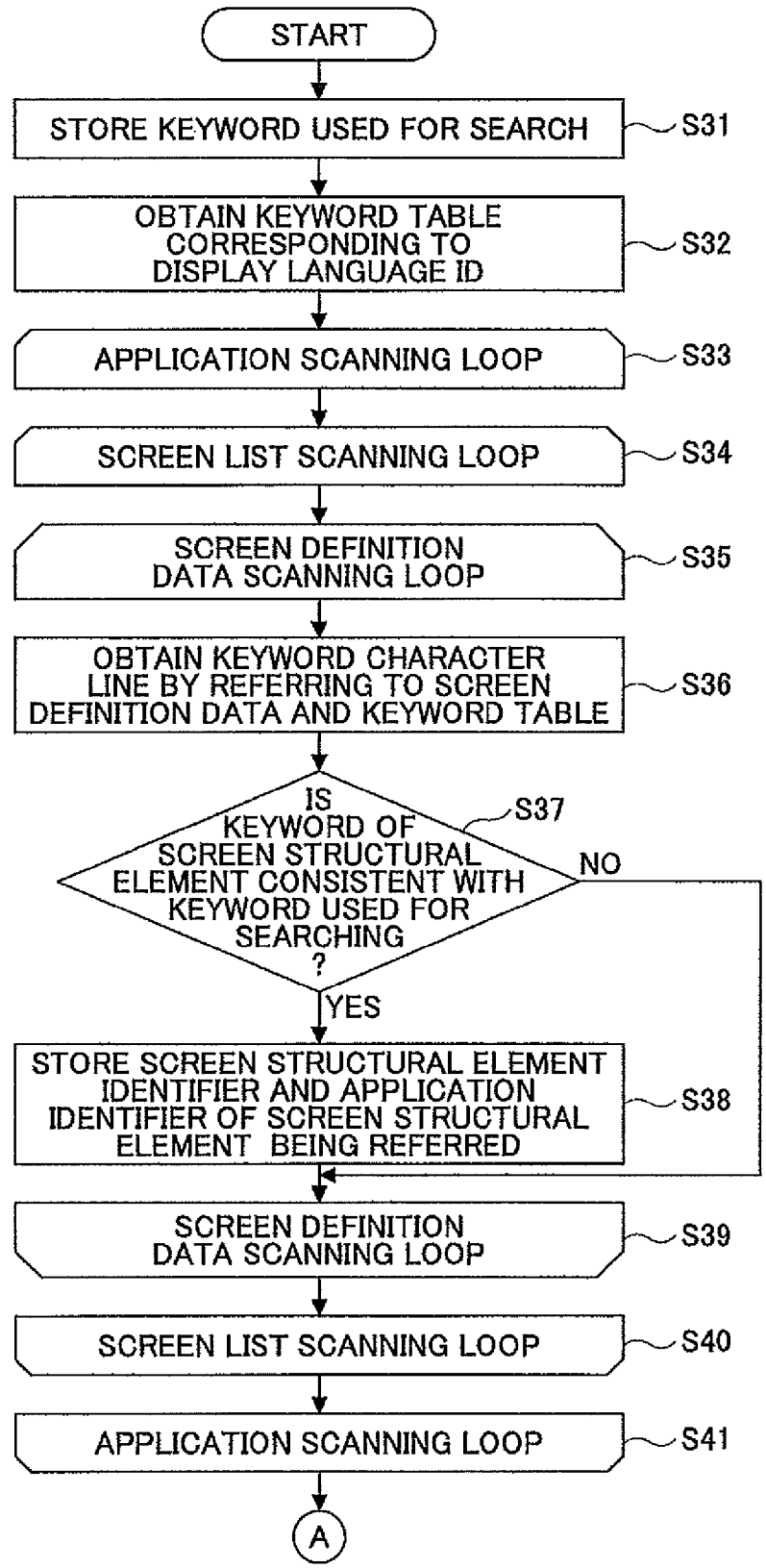
FIG. 16 is a first flowchart of a displaying process of a search result display part shown in FIG. 12.
Figure 17:
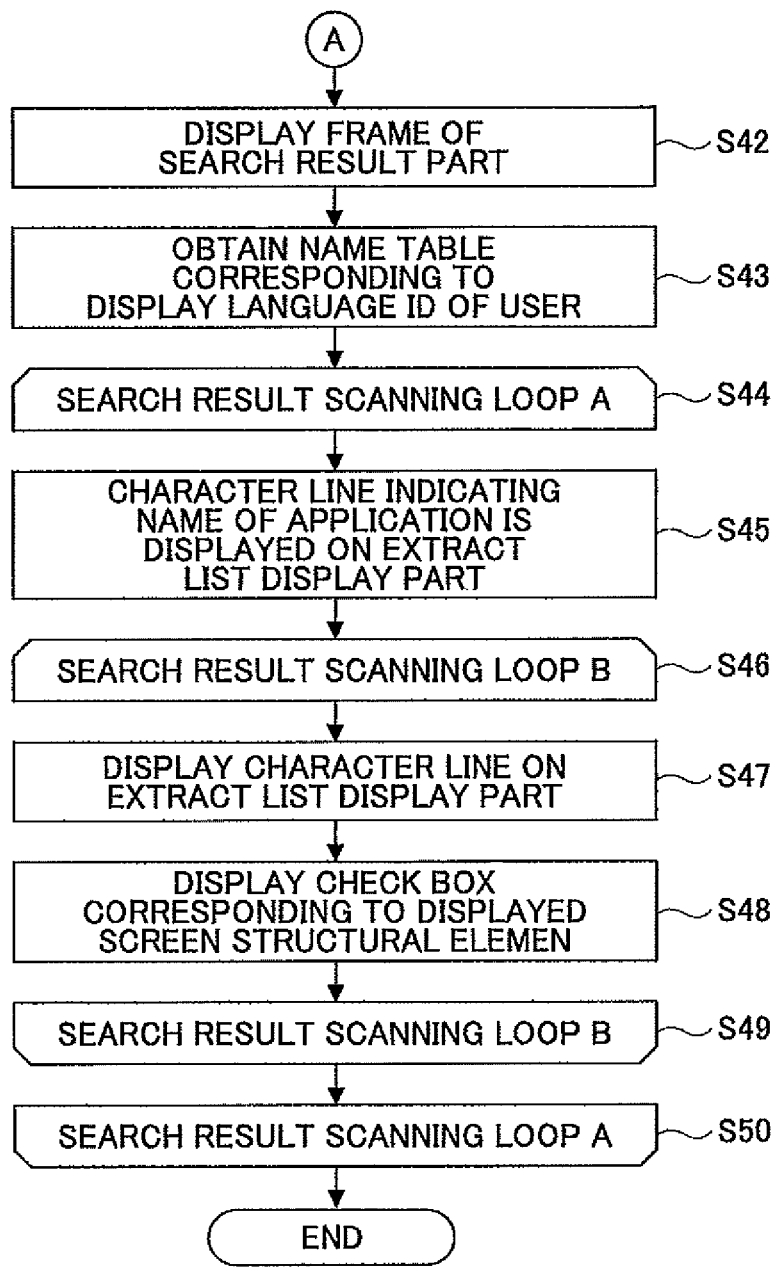
FIG. 17 is a second flowchart of the displaying process of the search result display part shown in FIG. 12.

Next, flowcharts of the display process of the search result display part 420 shown in FIG. 14 are shown in FIG. 16 and FIG. 17. This process is implemented when the search button 413 shown in FIG. 13 or the related element search button 370 shown in FIG. 12 is pressed.

In this case, the CPU of the PC 40 stores a keyword used for searching in step S31. In step S32 as well as step S15 shown in FIG. 15, the CPU obtains a keyword table corresponding to a display language ID of a user who is editing. A keyword used for searching is the sane as the keyword being input to the keyword input part 411 in a case where the search button 413 is pressed.

In a case where the related element search button 370 is pressed, the keyword used for searching is the same as a keyword corresponding to the screen structural element selected as the editing subject at the time when the related element search button 370 is pressed. In this case, by processes as well as the steps S23 and S24 shown in FIG. 15, a keyword used for searching can be obtained.

After step S32, three loop processes are implemented in step S33 through S41.

A first loop is an application scanning loop where the processes in step S34 through S40 are implemented via the UI customization tool 200 by using each application using the GUI being edited as a reference subject in order. The application which should be the reference subject is determined by a list of the applications shown in FIG. 3. The application scanning loop is performed until all applications are referred to.

A second loop is a screen list scanning loop where processes in step S35 through S39 are implemented by using each screen definition data set indicating the GUI used by the application which is a reference subject in step S33 as reference subjects in order. Here, the screen definition data set which should be the subject reference can be determined by the screen list data sets shown in FIG. 3. The second loop is implemented until all screen definition data sets used by all applications which are reference subjects are referred to.

A third loop is a screen definition data scanning loop where processes in step S36 through S38 are implemented by using each screen structural element registered in the screen definition data which are a reference subject in step S34 as reference subjects in order. In the screen definition data scanning loop, in step S36, a keyword character line corresponding to the screen structural element being referred to is obtained. A keyword ID of the screen structural element being referred to is obtained from the screen definition data being referred to and a keyword character line corresponding to the keyword ID can be obtained from a keyword table obtained in step S32.

In step S37, a keyword character line obtained in step S36 is compared with a keyword for searching stored in step S31. If the keyword character line obtained in step S36 is consistent with the keyword for searching stored in step S31, the screen structural element being referred to can be determined as a screen structural element to be extracted by searching. Hence, the process goes to step S38 so that, with respect to the screen structural element being referred to, the application identifier and the screen structural element identifier are stored.

After three loop processes are completed, the process goes to step S42 in order to display the search result display part 420 indicating the extraction result of the screen structural element based on data stored in step S38, so that a process shown in FIG. 17 is implemented.

First, in step S42, the frame of the search result display part 420 is displayed. This "frame" makes a fixed display, regardless of the contents of the extracted screen structural element, other than the extraction list display part 421 of the search result display part 420.

In step S43, a name table corresponding to the display language ID of the user who is editing is obtained. After that, until all applications where the identifiers are stored in step S38, namely applications where at least one of the screen structural elements extracted by search belongs, are referred to, each application is referred to in order so that the process of the search result scanning loop A of the step S44 through S50 is implemented. Even if the application identifiers are stored plural times with respect to the same application, the application identifier is referred to only one time.

In the search result scanning loop A, in step S45, based on the application identifier and the display language ID of the user who is editing, a character line indicating a name of the referred to application is obtained from the table (not shown) and displayed on the extract list display part 421. After that, in order to display the screen structural element used by the referred to application among the screen structural elements where the data are stored in step S38, these screen structural elements are referred to in order so that the process of the search result scanning loop B of step S46 through step S49 is implemented.

In the search result scanning loop B, in step S47, based on the screen structural element identifier and the display language ID of the user who is editing, the character line indicating the name of the screen structural element being referred to is obtained from the name table and processed if necessary. Then, the character line is displayed on the extract list display part 421. In step S48, a check box corresponding to the displayed screen structural element is displayed. Here, as a process of step S48, a process for connecting the character line of the name 1 and the character line of the name 2 registered in the name tables to each other by ":" is implemented. When the search result scanning loops A and B are completed, processes shown in FIG. 12 and FIG. 13 are ended.

Because of the above-discussed process, the PC 40 can display, corresponding to pressing the search button 413 or the related element search button 370 by the user, a list of the screen structural elements to which a keyword the same as that designated by the user corresponds on the search result display part 420 shown in FIG. 12. The effect of this is discussed above with reference to FIG. 14.

With respect to comparison of the keywords in step S37, it can be determined that the keywords are consistent with each other not only when the keywords are completely consistent with each other but also when the keywords are partially consistent with each other.

[Second Embodiment of the Present Invention: FIG. 18 through FIG. 30]

Next, a screen editing apparatus of a second embodiment of the present invention is discussed. The second embodiment is different from the first embodiment in that plural keywords having upper/lower relationships as keywords corresponding to the screen structural elements can be set and an area for searching the screen structural elements can be designated in the second embodiment of the present invention. In addition, while the screen editing apparatus and an image processing apparatus, configured to display the operations screen edited by the screen editing apparatus, have different formats of data to be handled because plural keywords are used in the second embodiment, the screen editing apparatus and the image processing apparatus have the same hardware structure or basic functional structure as those of the first embodiment.

Accordingly, the different points of the second embodiment from the first embodiment are mainly discussed. In addition, parts that are the same as the structure elements discussed in the first embodiment are given the same reference numerals.

First, uses of plural keywords having upper/lower relationships are discussed with reference to FIG. 18 through FIG. 23.

Figure 18:
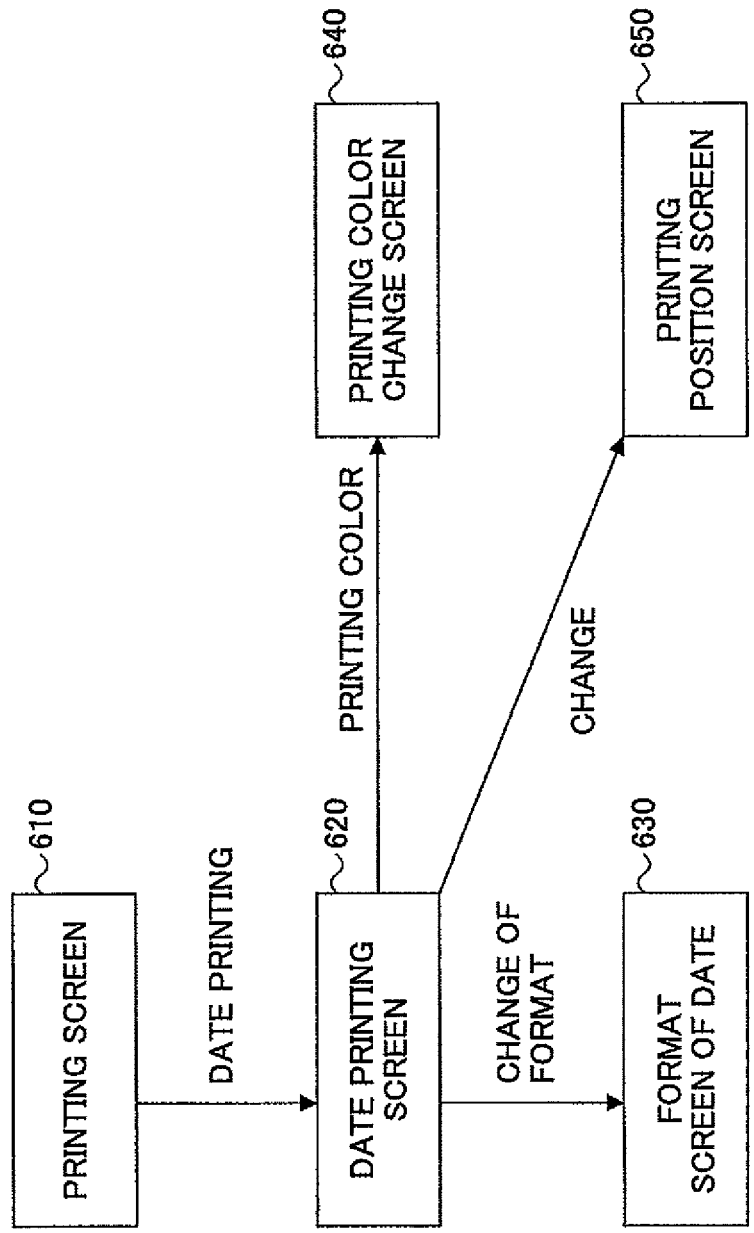
FIG. 18 is a view showing a transition example of a screen situated lower than a printing screen in screens which the image processing apparatus uses in a document box application.

FIG. 18 is a view showing a transition example of a screen lower than a printing screen in screens which the image processing apparatus 10 uses in the document box application. FIG. 19 through FIG. 23 are views showing display examples of the screens shown in FIG. 18.

Figure 19:
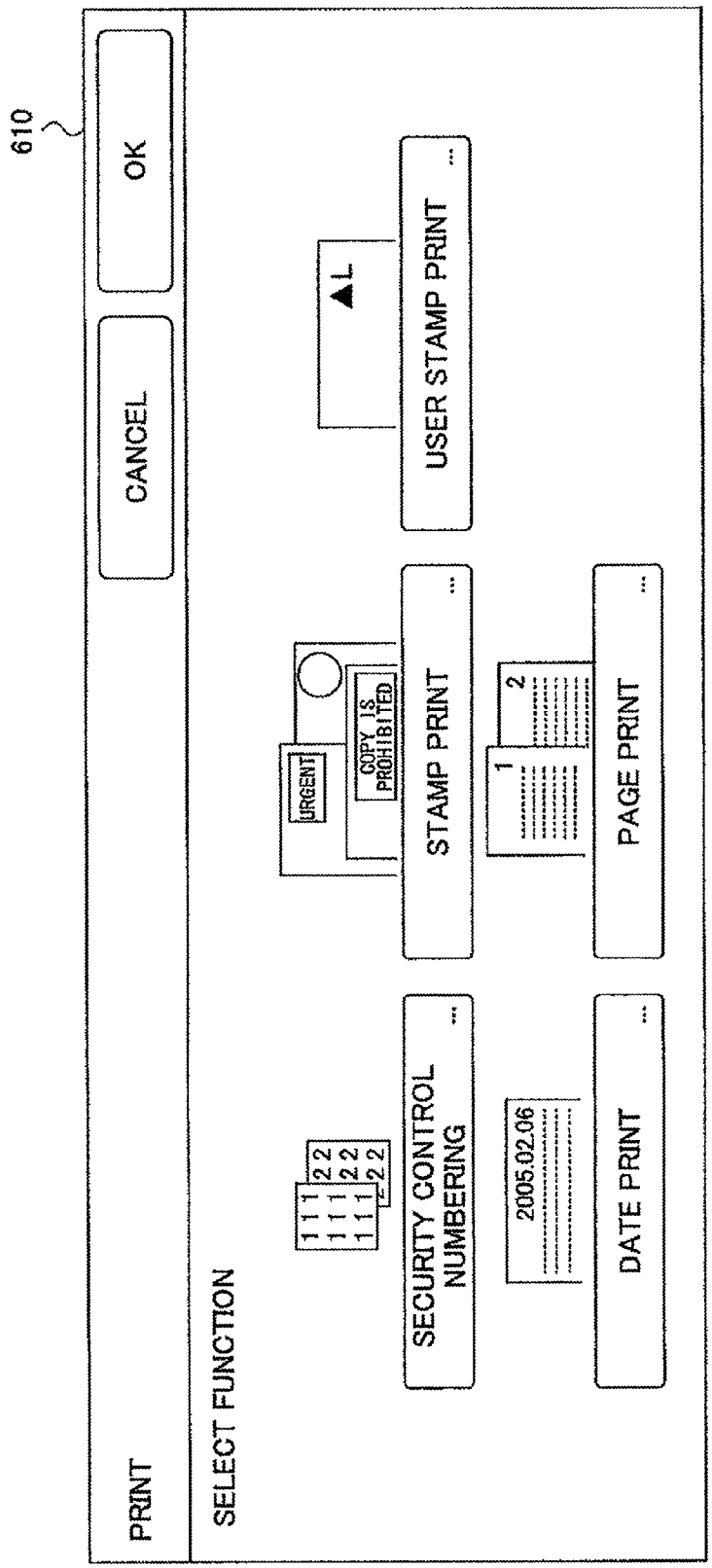
FIG. 19 is a view showing contents of a printing screen shown in FIG. 18.

A printing screen 610 shown in FIG. 19 is a top screen where contents of a stamp or bibliographic information printed with the stored document are set when the stored document is printed by the document box application. In this screen, by pressing buttons of the security control numbering, stamp print, user stamp print, date print, or page print which is a screen structural element arranged on the screen, the screen can be transferred to the lower screen for detailed setting of the contents of printing.

FIG. 19 is a view showing contents of a printing screen 610 shown in FIG. 18. More specifically, FIG. 19 is a view showing a part of the screen transition where the printing screen 610 is a start screen. In FIG. 19, the name of the screen is indicated in a rectangle. When a button near an arrow of the screen is pressed, the screen goes to the next screen of the screens indicated by the arrow. For example, the transition example shown in FIG. 19 shows that the display is transitioned to a date print screen 620 shown in FIG. 20 if the date printing button 611 is pressed in the printing screen 610.

Figure 20:
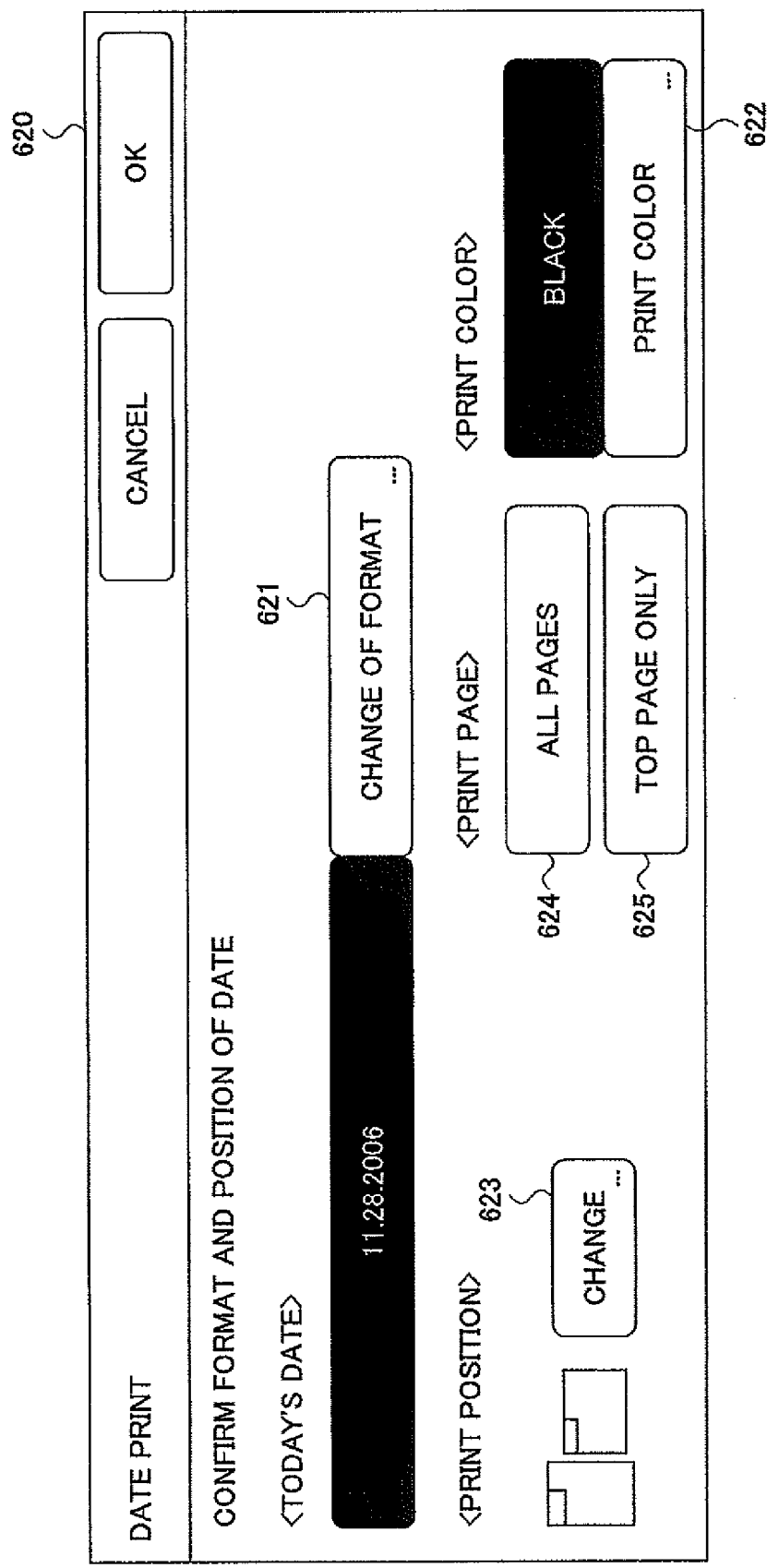
FIG. 20 is a view showing contents of a data printing screen shown in FIG. 18.
Figure 21:
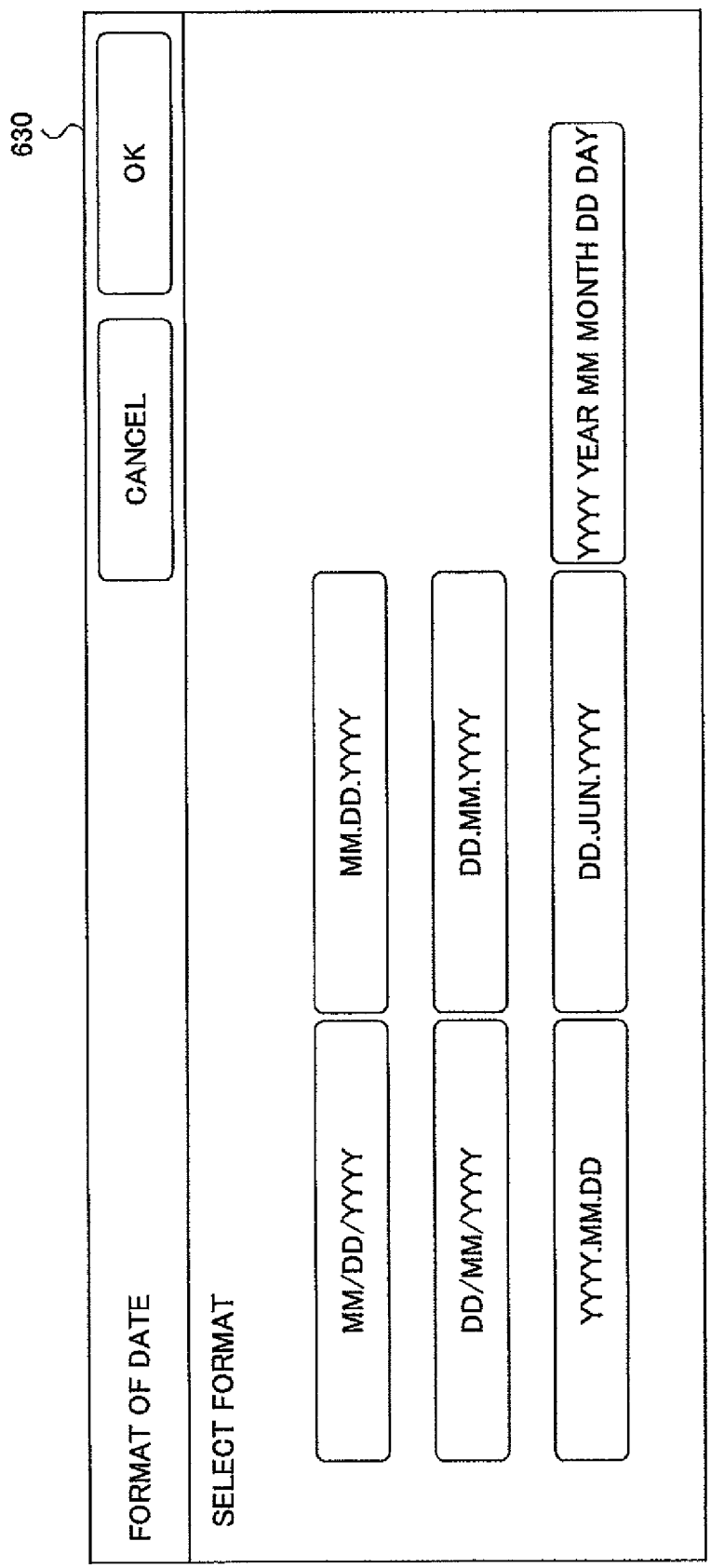
FIG. 21 is a view showing contents of a format screen shown in FIG. 18.

The date print screen 620 is a screen used for setting a format or a position of the date added to the document. By pressing the date print screen 620, the screen transitions to a lower screen for setting details for every item. For example, as shown in FIG. 20, when a change button 621 of the format is pressed, the screen transitions to a format screen 630 of the date shown in FIG. 21 for setting the format of the date.

Figure 22:
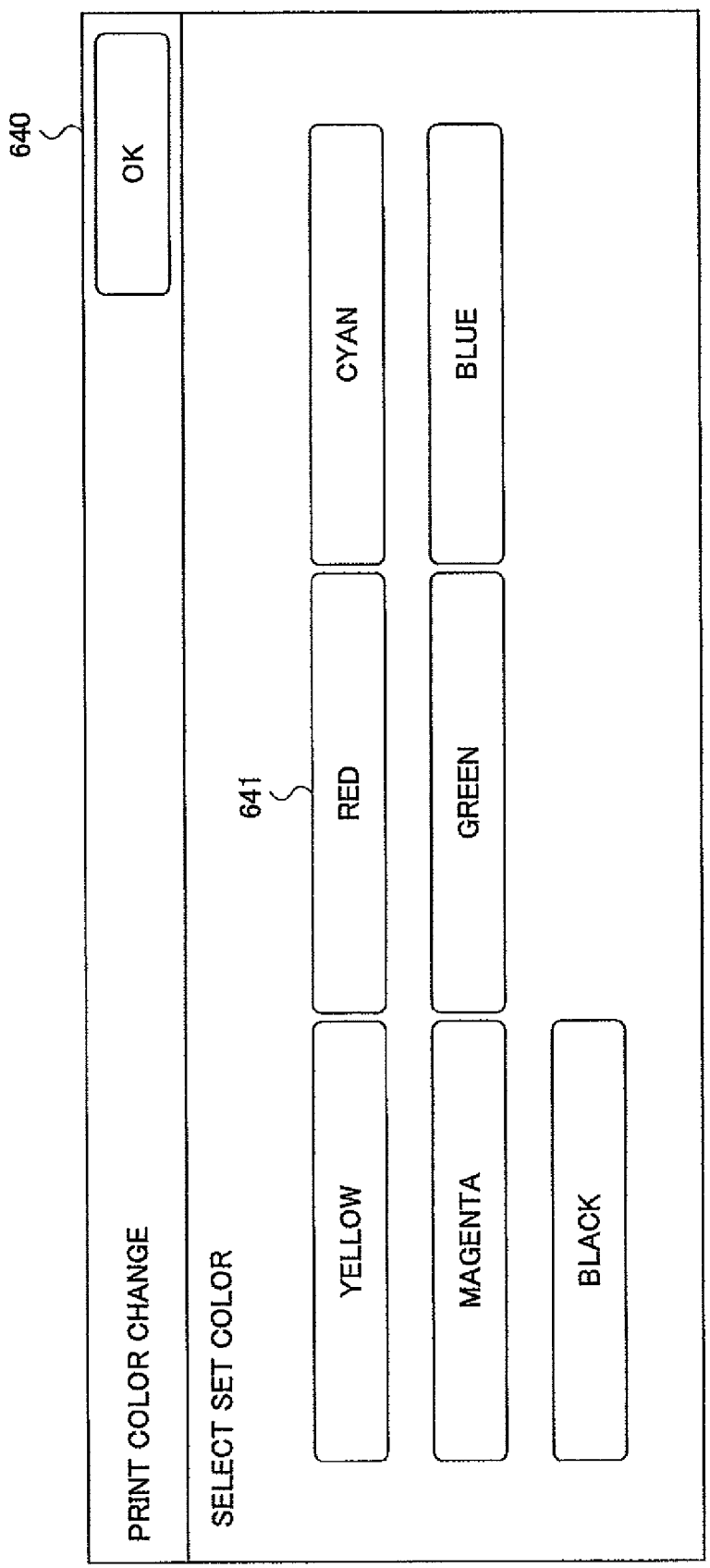
FIG. 22 is a view showing contents of a printing color change screen shown in FIG. 18.
Figure 23:
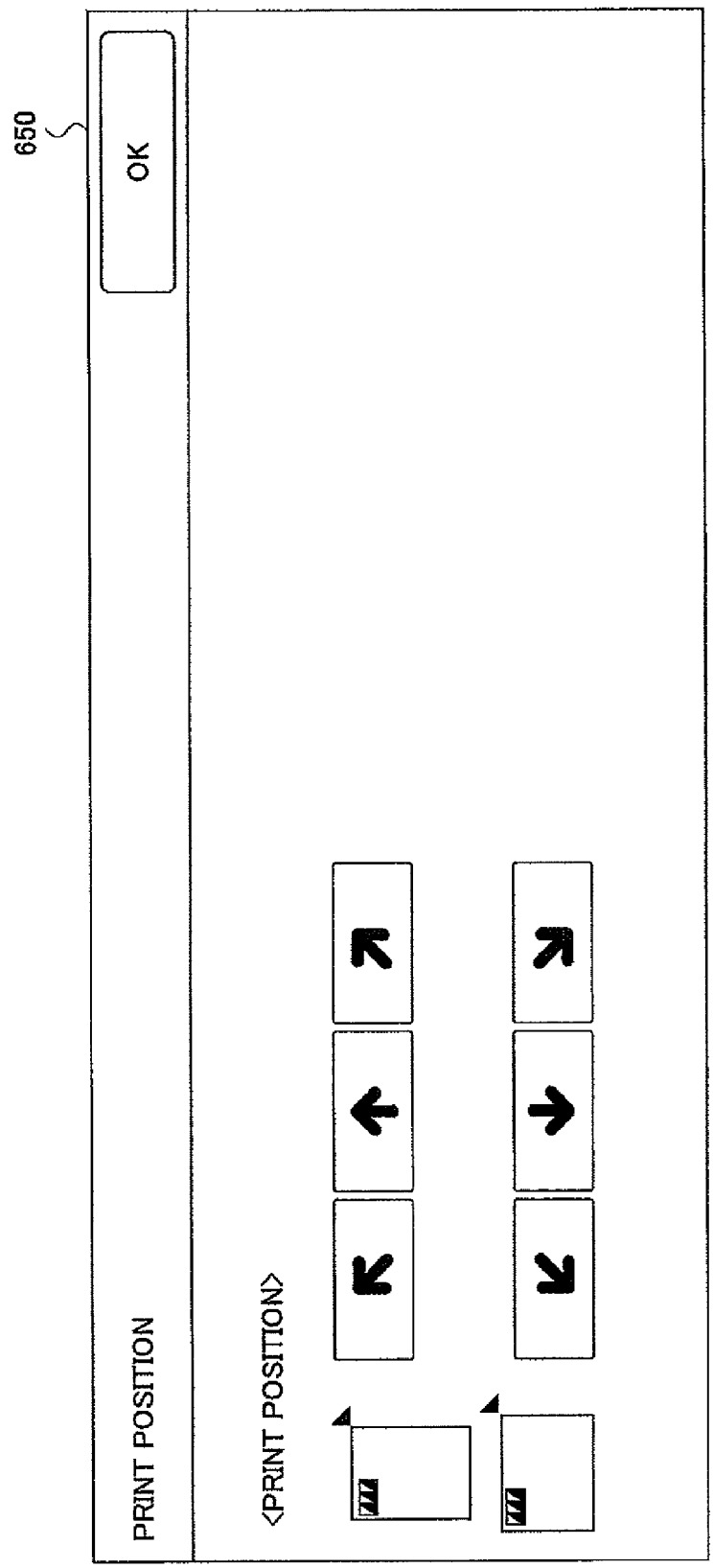
FIG. 23 is a view showing contents of a printing position screen shown in FIG. 18.

When a printing color button 622 is pressed, the screen transitions to a printing color change screen 640 of shown in FIG. 22 for setting the printing color of the date. When a change button 623 of the format is pressed, the screen transitions to a printing position screen 650 shown in FIG. 23 for setting the printing position of the date.

For example, seven buttons of yellow, red, cyan, magenta, green, blue and black which correspond to printing colors which can be set are arranged in the printing color change screen 640. By setting these buttons, the printing color of the date can be set.

In addition, it is possible to set whether the date is to be printed for all pages or only a top page by an all page button 624 or top page only button 625 on the date print screen 620.

Figure 24:
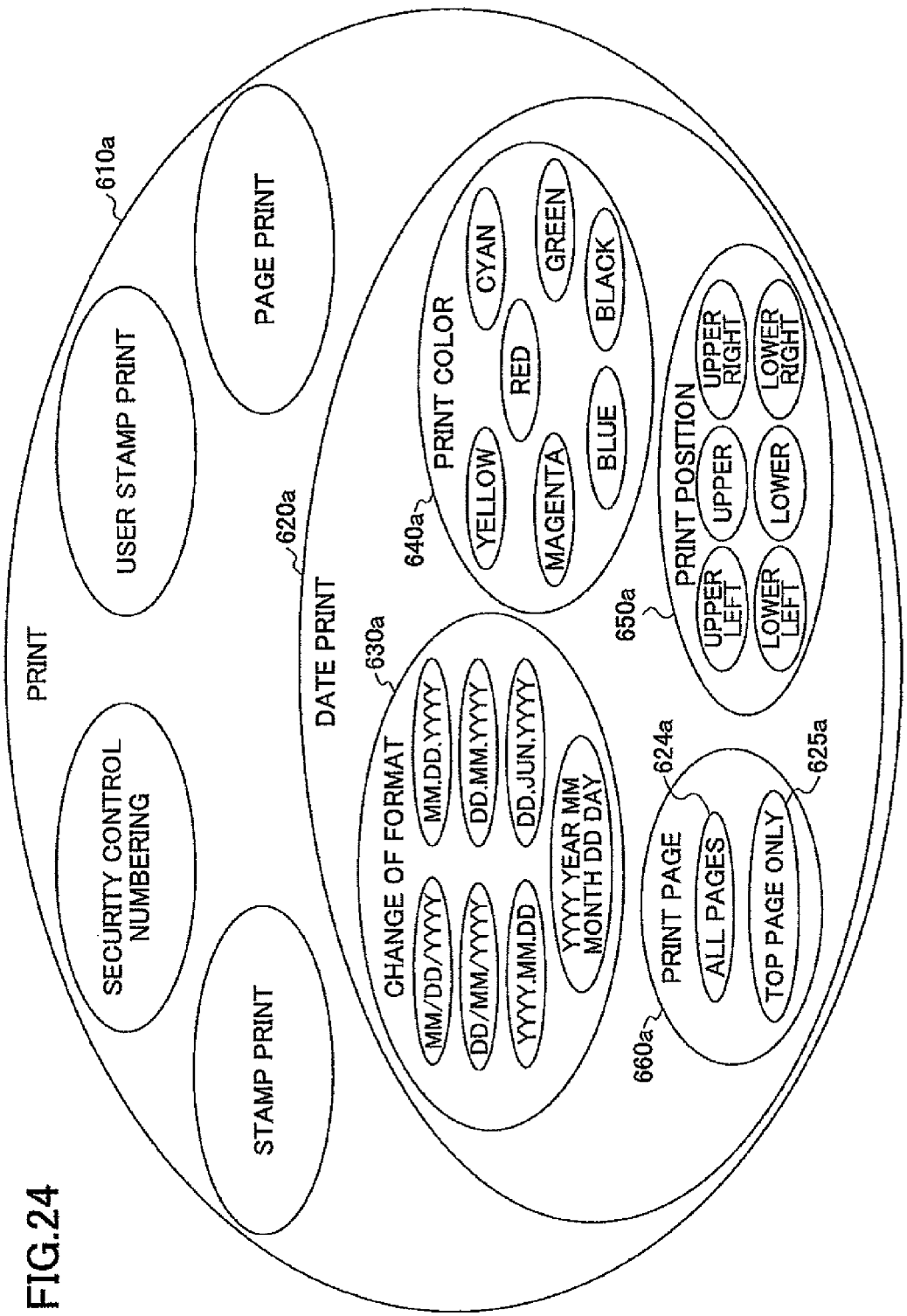
FIG. 24 is a view showing mutual relationships of buttons provided on the screens shown in FIG. 17 through FIG. 23.

FIG. 24 shows a Venn diagram indicting relationships of the buttons provided on the screen and shown in FIG. 19 through FIG. 23.

In an example shown in FIG. 24, an outermost aggregation 610a indicates an aggregation of screen structural elements related to the printing screen 610 situated at the top in the screens shown in FIG. 17 through FIG. 21.

Five ellipses inside the outermost aggregation 610a indicate buttons of security control numbering, stamp print, user stamp print, date print, and page print arranged on the print screen 610 and aggregations of screen structural elements related to lower screens displayed by pressing the button. Due to a limitation of space of the drawing, in FIG. 24, elements inside the aggregation of only the aggregation 620a regarding the date print button 611 are indicated in FIG. 24.

As elements of the aggregation 620a, there are aggregations 630a, 640a, and 650a corresponding to "change of format" button 621, "print color" button 622, and "change" button 623 for transitioning to the lower screen. Elements of these aggregations are the screen structural elements arranged on the screen transitioned based on the press of the button. In addition, as the element of the aggregation 620a, there are elements 624a and 625a corresponding to the "all page" button 624 and the "head page" button 625 for setting the print page, in the elements of the aggregation 620a.

In other words, a button for instructing the transition to the screen and a button arranged on the screen are included in the aggregation corresponding to each screen. In addition, the buttons may form a single aggregation with a functional unit, not a screen unit. In a case where the buttons, such as the "all page" button 624 and the "head page only" button 625, for setting the specific function are arranged in a single screen, these buttons form an original aggregation.

In addition, in order to simplify the drawing, in FIG. 24, only a button for setting a transition of the screen or value of the parameter is indicated. However, a mere message or other screen structural element such as a "OK" button or "RETURN" button may be regarded as an element of the aggregation corresponding to the screen to be arranged.

In the meantime, in the first embodiment of the present invention, a single keyword corresponds to each screen structural element. However, in this case, for example, if the keyword corresponding to the value of the parameter set by the button corresponds to the button, although it is possible to easily search for the button having a common parameter valuer it is difficult to search for the button having common parameter items set by the button.

For example, if keywords such as "auto color select", "full color", "two colors" or "single color" are made to correspond to buttons designating the number of colors, the keywords corresponding to these buttons are different. Because of this, it may not be possible to conduct the search by "items of the parameter to be set" such as "button for designating the number of colors".

Accordingly, in the second embodiment of the present invention, by using the mutual relationship of the screen structural elements shown in FIG. 24, plural keywords having upper/lower relationships are made to correspond to each screen structural element.

In the example shown in FIG. 24, "print" as a top first level keyword, may be made to correspond to the screen structural element belonging to the aggregation 610a related to the printing function. "Date print" as a second level keyword may be made to correspond to the screen structural element belonging to the aggregation 620a related to the date printing function. Similarly, "print color" as a third level keyword, may be made to correspond to the screen structural element belonging to the aggregation 640a related to setting of the print color. In addition, a lowest fourth level keyword indicating a specific screen structural element such as "yellow" or "red" may be made to correspond to each screen structural element arranged in the print color change screen 640.

By defining corresponding keywords based on the above-mentioned rule, four keywords, namely "print", "date print", "print color" and "red", are made to correspond to the red button 641 in the print color change screen 640. In addition, three keywords, namely "print", "date print", and "print color" are made to correspond to the print color button 622 in the date print screen 620. Since the fourth level keyword is not necessary, there is no need to prepare it. However, in order to distinguish "print color" from the screen structural element in the print color change screen 640, a keyword of the "print color" the same as the third level may be made to correspond. Thus, it is not mandatory to make all level keywords correspond.

In the example of FIG. 24, details of the date print function are shown. However, for example, if a screen for setting the print color is provided in the screen of the stamp printing function, the keyword of "print color" as the third level keyword similar with the date print function may be made to correspond to the button for displaying the screen or the button arranged on the screen. Thus, by conducting the search of the screen structural element with the third level keyword "print color", regardless of the upper function, it is possible to extract the screen structural element related to setting of the print color.

In addition, a hierarchical keyword can be defined for the screen structural element arranged on the screen with respect to the function other than the print function shown in FIG. 24. In this case, by using a lower keyword which is common with another function, it is possible to make extraction in a function-crossing manner.

In the second embodiment as well as the first embodiment, the keyword may be described in the screen definition data. Furthermore, in the second embodiment as well as the first embodiment, the screen definition data may be described as a keyword ID, the keyword table may be prepared for every language, and the keyword ID may be converted to a keyword character line.

FIG. 25 shows an example of screen definition data used in the second embodiment of the present invention. In FIG. 25, the screen definition data are described in an XML (Extensible Markup Language) format.

A single and upper "window" element in FIG. 25 indicates data of one screen of the GUI. In the attribute of the "window" element, the value of an "id" attribute indicates identification information of the GUI screen. The value of a "function" attribute indicates which application the GUI screen is used for, The value of "shape" attribute indicates a file name of the image data used as a background of the GUI screen.

A single "item" element which is a child element of the "window" element indicates data of a single screen structural element which can be arranged on the screen. The value of the attribute of the "item" element indicates contents of each setting item in the screen definition data table shown in FIG. 6. An "id" attribute indicates an identifier of the screen structural element. A "type" attribute indicates a classification. An "x" attribute and a "y" attribute indicate a coordinate. A "w" attribute and an "h" attribute indicate "size". A "shape" attribute indicates a form. A "font" attribute indicates a font size. A "visible" attribute indicates a display/non-display. In the "visible" attribute, "true" indicates display and "false" indicates non-display.

The value of "customize" attribute where the second item element belongs indicates whether the value of the "visible" attribute can be set to "false", namely whether the screen structural element can be set as non-display. A "false" indicates that this is impossible. If a certain part of the screen structural elements are made non-displayed, it may inconvenience the operations of the GUI. Therefore, in order to set these screen structural elements as "display", the "customize" attribute is provided. In the example shown in FIG. 25, a second item attribute indicates "OK" button. It this is set as non-display, the setting contents cannot be fixed and therefore operations of the GUI may be troublesome. Accordingly, the value of this "visible" attribute is set as "false".

In addition, the keyword ID is described as an attribute of the "keyword" element which is a child element of the "item" element. In the example shown in FIG. 25, four levels keywords can be set. Keyword IDs of the four levels can be described as attribute values of "kw1", "kw2", "kw3", and "kw4". If a keyword of a certain level is not set, the attribute value simply corresponding to the keyword may not be described.

FIG. 26 shows an example of a keyword table used in the second embodiment of the present invention.

This keyword table, as well as the screen definition data, may be described in the XML format. A single top "message_list" element indicates the contents of a single keyword table. The value of the "language" attribute indicates whether this table describes a keyword character line of the language used. In addition, a single "message" element which is a child element of the "message list" element indicates date with respect to a single keyword. In other words, the value of the "id" attribute of the "message" element indicates the keyword ID. The value of a "string" attribute indicates the corresponding keyword character line.

There is no need to describe in the keyword table that the keyword ID indicates the keyword of which level. In addition, even if the same keyword ID is used for indicating the plural different level keywords, there is no problem.

In addition, while illustration is omitted, the name table as well as the keyword table can be described in the XML format. For example, the value of the "id" attribute of the "message" element may indicate the screen structure element ID. The value of the "string" attribute may indicate the character line of the corresponding name. In a case where plural names are registered as shown in FIG. 10 and FIG. 11, these names may be described as a "string 1" attribute, "string 2" attribute, or the like.

Next, a display example of the search display part of the second embodiment of the present invention is shown in FIG. 27.

In the second embodiment as well as the first embodiment of the present invention, when the search tab 401 is selected in the GUI editing screen, PC 40 displays the search display part. The contents of the search display part are shown in FIG. 25.

In other words, in addition to the search button 413 for receiving the instruction to start the search, the search area setting part 430, keyword select parts 414 through 444 and the search conditions setting part 451 are provided on the search display part 410'.

The search area setting part 430 receives designation of the search area when the screen structure element is searched. In the search area setting part 430, check boxes are provided for every application. By checking or not checking the check box, whether the date of the GUI used in each application is included in the search area can be set. For which application the check box is provided for can be determined, for example, by searching the value of the "function" attribute of the "window" element in the screen definition data read by the PC 40 as the editing subject.

The keyword select parts 441 through 444 receive selection of the keywords of the first through fourth levels (item 1 through item 4) used for searching. As the keyword select part 444 receives the selection of the item 4 (fourth level), selection of the keyword is received by a pull-down menu 445. Which keyword is displayed in the pull-down menu as options is discussed below.

The search conditions setting part 451 receives settings for a keyword of which level is considered at the time of searching. The search conditions setting part 451 is a text box where the user can properly input a logical formula. FIG. 27 shows a setting example for which an "AND search" is performed for all keywords of the item 1 through item 4. Selection of an item of the keyword used for the "AND search" may be received by not a text box but by a check box or the like.

In such a search display part 410', when the search button 413 is pressed after the user sets the search area, the keyword, and the search conditions, the CPU of the PC 40 searches all screen data which are read as the editing subject, extracts the screen structural element consistent with the designated conditions, and displays the element on the search result display part 420 discussed in the first embodiment with reference to FIG. 14. A screen which is the same as for the first embodiment can be used for the screen of the search result display part 420.

Next, a process implemented by the CPU of the PC 40 for performing functions of extraction of the screen structural elements is discussed. The CPU of the PC 40 executes an application program for performing functions of the UI customization tool 200.

FIG. 28 shows a flowchart of a display process of a pull down menu of the search display part 410'. This process is performed when the button for opening the pull down menu is pressed in the search display part 410' shown in FIG. 27.

In this process, in step S61, it is determined in which item's keyword select part a button for opening the pull down menu is pressed. Based on the selected items 1 through 4, the process goes to one of steps S62 through S65 so that the search item and the reference item are set.

More specifically, when a button of the keyword select part 441 of the item 1 is pressed, in step S62, "nothing" is set as the search condition, and "item 1" is set as the reference item. When a button of the keyword select part 442 of the item 2 is pressed, in step S63, "item 1" is set as the search condition, and "item 2" is set as the reference item. When a button of the item 3 is pressed, in step S64, "item 1 & item 2" is set as the search condition, and "item 3" is set as the reference item. When a button of the item 4 is pressed, in step S65, "item 1 & item 2 & item 3" is set as the search condition, and "item 4" is set as the reference item. That is, an item corresponding to the keyword select part where the button is pressed is set as the reference item. An item upper to the above-mentioned item is set as the search condition.

After steps S62 through S65, two loop processes are performed in steps S66 through S71.

A first loop is a screen list scanning loop where processes of steps S67 through S70 are executed by using all screen definition data included in the data of the GUI being edited by the UI customization tool 200 as the reference subject in order. The screen list scanning loop is performed until all screen definition data are referred to.

A second loop is a screen definition data scanning loop where processes of steps S68 and S69 are executed by using each screen structural element, as the reference subject, included in the screen definition data which are the reference subjects in step S66.

In the screen definition date scanning loop, in step S68, it is determined whether all keyword IDs of the search item related to the screen structural element being referred to are consistent with the keyword ID of the keyword selected for the item. This search item is set in steps S62 through S65. In addition, when the keyword character line is selected by the pull down menu, the keyword ID of the keyword selected for each item may be stored by correlating it to the keyword line. If the search item is "nothing", the determination in step S68 is always regarded as "YES". If the keyword for the search item is not selected, it and the keyword ID of the item are always consistent with each other.

If YES is determined in step S68, the process goes to step S69 so that the keyword ID of the reference item with respect to the screen structural element being referred to is stored and the process goes to step S70. If NO is determined in step S68, the process goes to step S70.

When two loops are completed, the keyword ID of the item whose button is pressed of all screen structural elements where the same keyword as the presently selected one with respect to items upper to item whose button is pressed, among the screen structural elements which can be arranged on the GUI by the GUI customization tool 200, can be stored.

After these processes, in step S72, a keyword table corresponding to the display language ID of the user who is editing is obtained. The display ID can be determined in this step as well as the step S15 of FIG. 15. After that, the keyword ID scanning loop of step S73 through S75 is repeated by referring to all kinds of the keyword ID stored in step S69 in order. In other words, a keyword corresponding to the keyword being referred is obtained from the character line conversion table obtained in step S72 and is stored. While the same keyword ID is stored plural times in step S69, a single kind of the reference subject is stored one time in step S73.

In addition, because a list of the keyword character lines to be displayed as options of the pull down menu can be made by the keyword ID scanning loop process, in next step S76, following the list, a pull down menu for selection of the keywords of the item whose button is pressed is displayed so that the process ends.

By the above-discussed process, when the keyword used for searching is selected in order from the top, it is possible to automatically form a pull down menu where a lower keyword related to the already selected keyword can be easily selected. Hence, it is possible to efficiently select plural keywords used for searching. Especially, in a case where "AND searching" is performed for all keywords, it is possible to select the keyword so that the search subject can be narrowed down in a stepwise manner.

Figure 29:
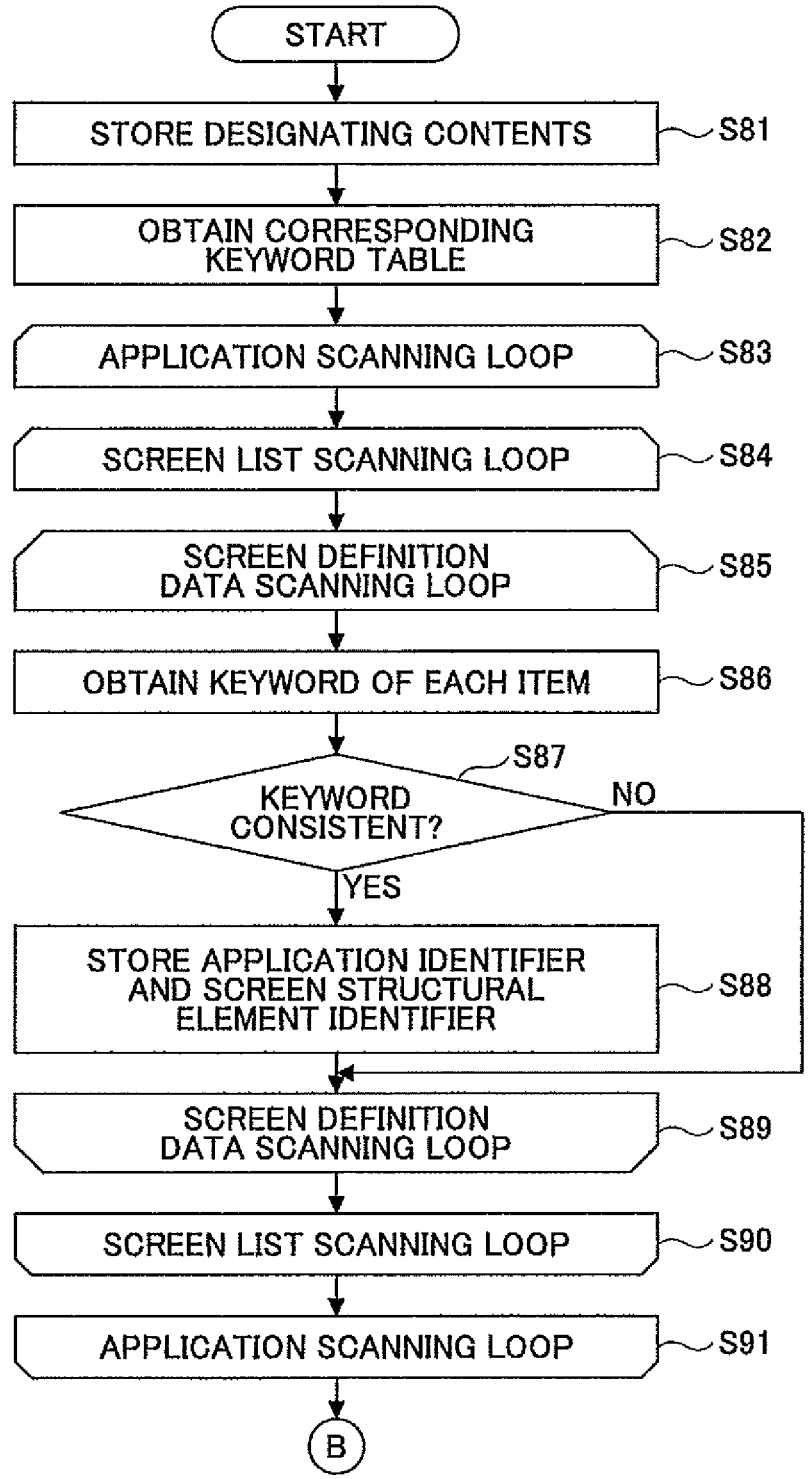
FIG. 29 is a first flowchart of a displaying process of the result of a search implemented in a case where the search is directed by the search display part.
Figure 30:
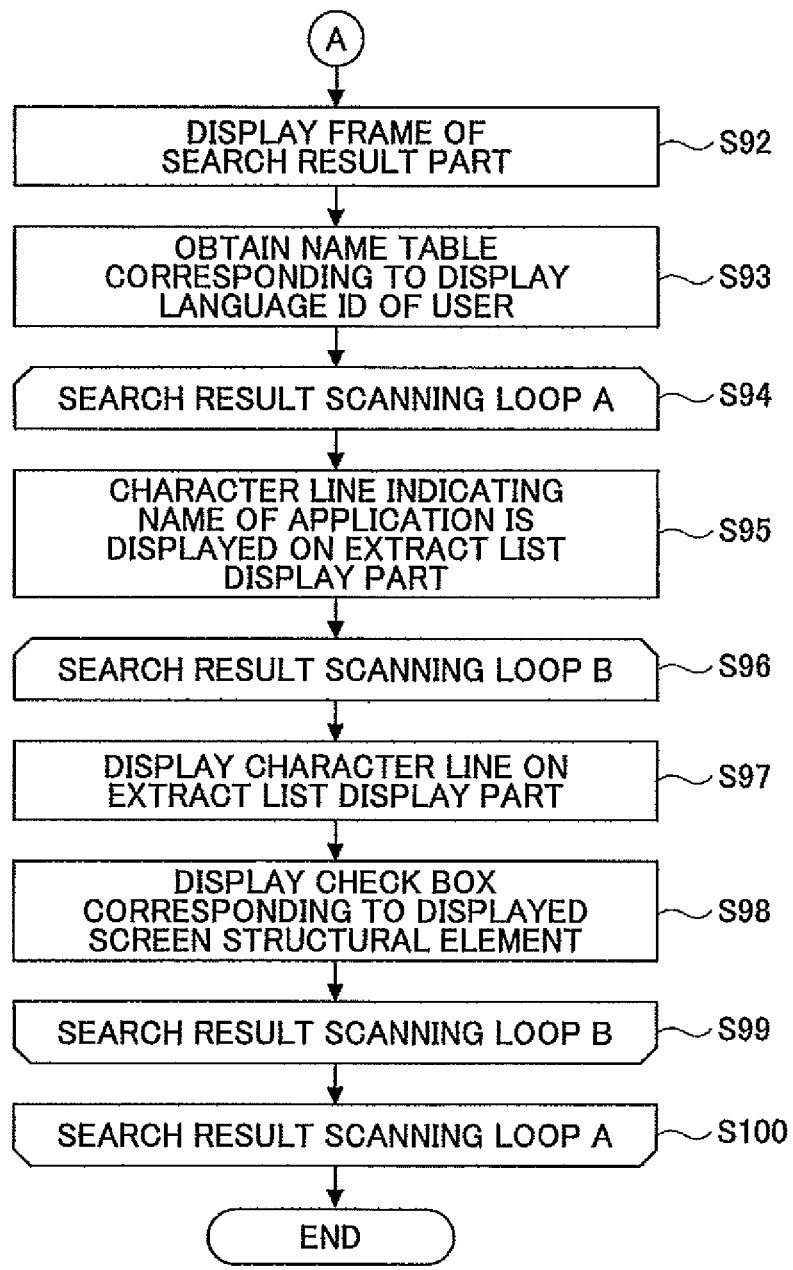
FIG. 30 is a second flowchart of the displaying process of the result of a search implemented in the case where the search is directed by the search display part.

Next, a flowchart of the display process of the result of searching in a case where the search is directed on the search display part 410' shown in FIG. 27, is shown in FIG. 29 and FIG. 30. This process is performed in a case where the search button 413 show in FIG. 27 is pressed. A display format of the search result is the same as that discussed in the first embodiment with reference to FIG. 14.

In this case, the CPU of the PC 40, in step S81, stores the designating contents received by the search display part 410' of the search subject application, the keyword of each item used for searching and searching conditions. The CPU of the PC 40, in step S82, obtains the keyword table corresponding to the display language ID of the user who is editing. The display language ID can be recognized by a process the same as that of step S15 shown in FIG. 15.

After that, three loop processes are performed in steps S83 through S91.

A first loop is an application scanning loop where the processes in step S84 through S90 are implemented by using each application which is the search subject stored in step S81 as a reference subject in order.

A second loop is a screen list scanning loop where processes in step S85 through S89 are implemented by using each screen definition data set used by the application which is a reference subject in step S83 as reference subjects in order. Here, the screen definition data set which should be the subject reference can be determined by the screen list data shown in FIG. 3.

A third loop is a screen definition data scanning loop where processes in step S86 through S88 are implemented by using, in order, each screen structural element included in the screen definition data set which is the reference subject of step S84.

In the screen definition data scanning loop, in step S86, a keyword of each item corresponding to the screen structural element being referred to is obtained. More specifically, the keyword ID corresponding to the screen structural element being referred to is obtained from the screen definition data set being referred to and a keyword character line corresponding to this keyword ID is obtained from the keyword table obtained in step S82.

In step S87, the keyword obtained in step S86 is compared with the keyword used for searching and stored in step S81, for every item. If these keywords are consistent with each other for the item indicated by the search conditions stored in step S81, it can be determined that the screen structural element being referred to is the screen structural element to be extracted by searching. In this case, the process goes to step S88, and an application identifier ("function" attribute of the "window" element) indicating that the screen structural element being referred to is contained in the screen used by which application and the screen structural element identifier ("id" attribute of the "item" element) which is an identifier of the screen structural element are stored.

When three loop processes are completed based on the data stored in step S88, in order to display the search result display part 420 indicating the result of extraction of the screen structural element, the process goes to step S92 so that processes shown in FIG. 30 are performed.

In step S92, the frame of the search result display part 420 is displayed. This "frame" makes a fixed display, regardless of the contents of the extracted screen structural element, other than the extraction list display part 421 of the search result display part 420.

Then, in step S93, a name list corresponding to the display language ID of the user who is editing is obtained.

Next, two loop processes are implemented in steps S94 through S100. The first loop is a search result scanning loop A where processes of step S95 through S99 are implemented by using all applications whose identifiers are stored as reference subjects. Even if the application identifiers are stored plural times with respect to the same application, the application identifier is referred to only one time.

In step S95, based on the application identifier and the display language ID of the user who is editing, a name character line of the referred to application is obtained from the table (not shown) and displayed on the extract list display part 421 of the search result display part 420.

After that, in the search result scanning loop B of step S96 through step S99, step 97 and step 98 are performed by using, as a reference subject, the screen structural element where the data are stored in step S88 and the application identifier is consistent with the application.

That is, in step S97, based on the screen structural element identifier and the character line table obtained in step S93, the character line indicating the name of the screen structural element being referred to is obtained and processed if necessary. Then, the character line is displayed on the extract list display part 421 as a character line indicating the extracted screen structural element. In step S98, a check box corresponding to the displayed screen structural element is displayed on the extract list display part 421.

When the search result scanning loops A and B in steps S94 through S100 are completed, the processes shown in FIG. 30 are ended.

Because of the above-discussed processes, the PC 40 can display, corresponding to pressing the search button 413 and following plural keywords and search conditions designated by the user, a list of the screen structural elements to which a keyword which is the same as that designated by the user corresponds. Based on the screen structural element being arranged on the screen as used by which application, it is possible to display the screen structural element by classifying the screen structural element.

In this embodiment, because plural keywords having upper and lower relationships can be set in each screen structural element, it is possible to conduct the search by using the systematized keyword and to easily narrow down details of the screen structural element of the subject.

Figure 31:
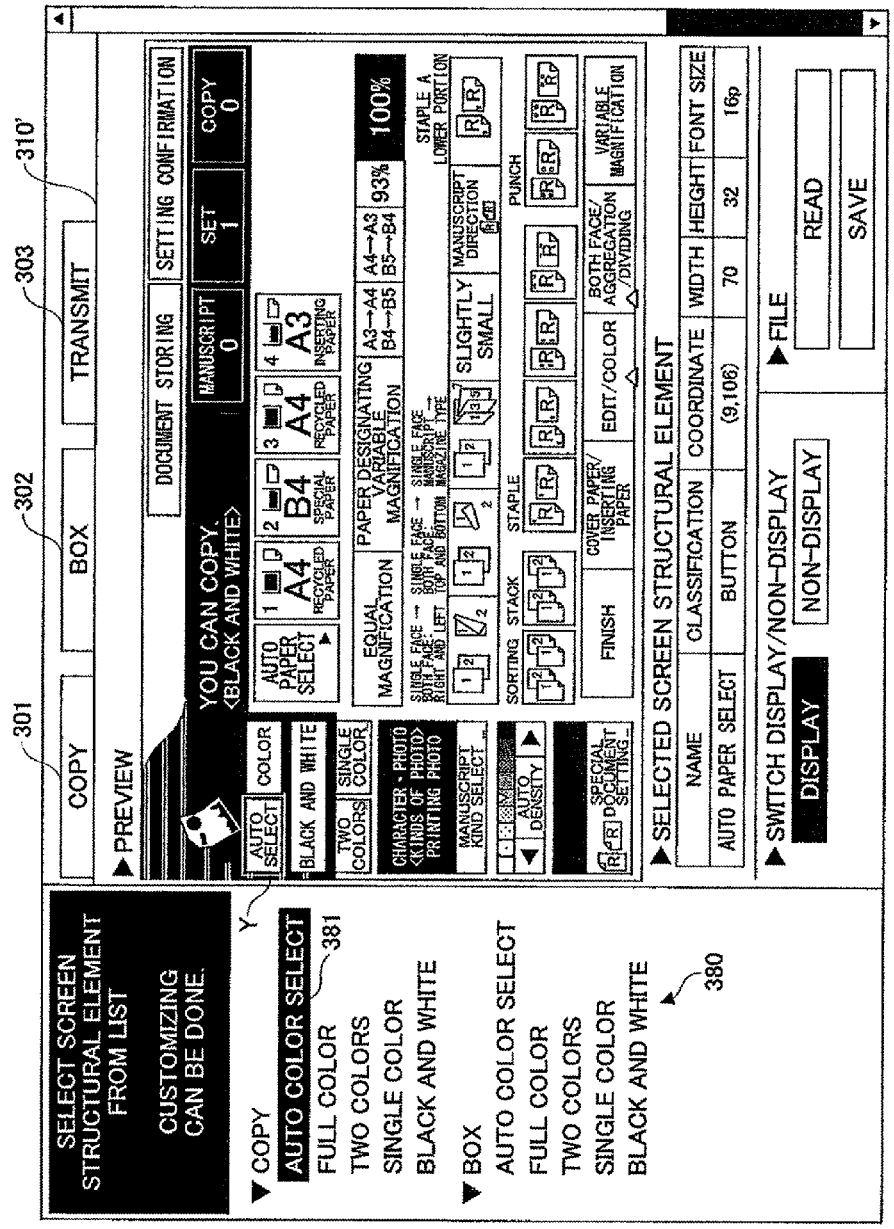
FIG. 31 is a view showing an example of a screen where the PC, which is a screen editing device of the modified example of an embodiment of the present invention, displays the search result of the screen structural element.

[Modified Example: FIG. 31]

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

For example, a structure of the apparatus, concrete process contents, contents or use of the screen to be displayed, a data format, and others are not limited to the above-discussed embodiments.

For example, the search result of the screen structural element may be displayed near the editing contents display part 310 shown in FIG. 31, instead of the search result display part shown in FIG. 14.

FIG. 31 is a view showing an example of a screen where the PC which is a screen editing device of the modified example of the present invention displays the search result of the screen structural element.

In this example, the search result of the screen structural element is displayed, as the extract list 380, near the edit contents display part 310' receiving the edit operations on the GUI screen. A process necessary for the format and display of the list may be the same as that in a case of the extract list display part 421 explained in the above-mentioned embodiments. In the example shown in FIG. 29, due to a limitation of the display space, while the extracted screen structural element can be displayed by only "name 2" shown in FIG. 10, display using the "name 1" may be made.

In addition, the screen structural element of the extract list 380 can be selected by the click of a mouse or the like. The PC 40 indicates the screen structural element selected by a cursor 381. In addition, at this time, the screen structural element selected by the extract list 380 is selected as the screen structural element which receives the editing operations in the editing contents display part 310 and display is emphasized so that the user can specify the screen structural element. For example, as indicated by a reference "A", the selected screen structural element surrounded by a frame line is displayed.

If the screen structural element selected by the extract list 380 is not displayed on the GUI screen which is displayed at present or is used by an application different from the application selected by the tab at present, selection of the GUI screen or the tab is switched to include of the screen structural element selected by the extract list 380.

Because of the above-discussed display, the user can easily recognize the screen structural element extracted by the keyword search and arranged on which screen. In addition, by merely selecting the screen structural element from the list, it is possible to immediately perform editing operations with respect to the screen structural element extracted on the editing contents display part 310. Hence, it is possible to perform efficient editing operations.

As a display for emphasizing the selected screen structural element, various ways such as frame making, flashing, color changing, density changing, or hatching, may be applied. In addition, in a case where a character line indicating any screen structural element is clicked in the extract list display part 421, the screen switch to the display of the extract list 380 and the edit contents display part 310 when the screen structural element is selected.

In addition, not only the screen structural element selected by the extract list 380 but also the screen structural element arranged on the same screen of the selected screen structural element among the extracted screen structural elements may be emphasized and displayed. Alternatively, in a case where the preview of the GUI screen is displayed on the editing contents display part 310 regardless of the screen structural element of the extract list 380, the screen structural element extracted by keyword search among the screen structural elements displayed on the screen may be emphasized and displayed.

In addition, with respect to the display of the extract list 380, in order to recognize that the extracted screen structural element is arranged on which GUI screen, the list may be displayed for not only every application but also every GUI screen. When plural keywords are systematically provided on each screen structural element, like the second embodiment of the present invention, instead of or in addition to the name of the screen structural element, the extract result is displayed by using the keyword itself or the search result is sorted by an upper keyword and is displayed by arranging plural keyword from upper to lower, and thereby it is possible to easily find the screen structural element belongs to which screen. Classification of the screen structural element may be displayed with the keyword.

In addition, the keyword character line of each language may be directly described in the screen definition data. On the other hand, the keyword ID may not be described in the screen definition data and may be described in a different table. In this case, for example, a table corresponding to the identifier of the screen structural element and the keyword ID or the keyword character line may be separately prepared.

The present invention can be applied to a screen editing apparatus configured to edit the GUI used in the apparatus other than the image processing apparatus. For example, the present invention can be operated as an apparatus configured to edit an operations screen displayed on a display of an any electronic apparatus such as network consumer electronics, vending machines, medical equipment, electric power apparatuses, air conditioning systems, metering systems of gas, water, or electricity, automobiles, airplanes, general purpose computers, or the like. In addition, the operations part displayed on the screen is not limited to the button.

Furthermore, a program for making computer control hardware operate the screen editing apparatus is recorded in a recording medium of the embodiment of the present invention. By loading the program in RAM from the recording medium and causing a CPU to execute the program, it is possible to achieve the effect of the above-discussed embodiments or modified example. In addition, it is possible to provide such a program by not only distribution of the recording medium but also downloading.

In addition, the structure of each of the above-discussed embodiments and the modified example can be properly combined.

As discussed above, according to the embodiments of the present invention, it is possible to provide a screen editing device and a screen editing method whereby in a case where a screen to be displayed on a display is edited, it is possible to efficiently find a portion to be edited by a user and improve efficiency of editing operations, and a computer program product for making a computer function as the screen editing device.

Thus, according to the embodiments of the present invention, it is possible to provide an editing environment where the screen to be displayed on the display can be easily customized.

This patent application is based on Japanese Priority Patent Application No. 2007-213465 filed on Aug. 20, 2007, the entire contents of which are hereby incorporated herein by reference.

What is claimed is:
1. A screen editing device for editing multiple operations screens, the screen editing device comprising:
   a central processing unit including
      an attribute information storing part configured to store one or more attributes for each of screen structural elements arranged on the operations screens, wherein the screen structural elements having the same attributes are arranged on two or more of the operations screens;
     a selection receiving part configured to select one of the screen structural elements that is to be edited;
     a display setting part configured to set whether to display the one of the screen structural elements selected by the selection receiving part on the corresponding operations screens;

an attribute information receiving part configured to receive an input of the attribute;

a first extraction part configured to extract the screen structural elements with the attribute received by the attribute information receiving part and display the extracted screen structural elements as candidate screen structural elements for display-setting in an extract list;

a second extraction part configured to, by using the one of the screen structural elements selected to be edited from one of the operations screens and selecting a search tab, display and designate an initial value of an attribute corresponding to the selected screen structural element as an attribute search input, and configured to select screen structural elements corresponding to the initial value of the attribute and display the screen structural elements as the candidates of screen structural elements for display-setting in the extract list; and an editing contents display part configured to, in response to a selection of one of the candidate screen structural elements in the extract list, automatically switch from a currently displayed operations screen, that does not include the selected candidate screen structural element in the extract list, to display one of the operations screens that includes the selected candidate screen structural element in the extract list.

2. The screen editing device as claimed in claim 1, further comprising:

a display part configured to display a list of the one or more attributes, stored in the attribute information storing part, for each of the screen structural elements arranged on the operations screens being edited, wherein the selection receiving part includes an attribute selection receiving part configured to select the attribute used for extracting the one of the screen structural elements from the list displayed by the display part.

3. The screen editing device as claimed in claim 1, wherein the attribute information storing part stores plural attributes having upper/lower relationships as the attributes for each of the screen structural elements, and the first extraction part is configured to extract the screen structural elements by using a single or plural and optional level attribute among plural attributes.

4. The screen editing device as claimed in claim 1, further comprising:

a collective display-setting part configured to collectively set and display plural screen structural elements extracted by the first extraction part and selected by a user.

5. The screen editing device as claimed in claim 1, wherein the first extraction part includes a highlight displaying part configured to highlight and display the extracted screen structural elements in a preview of the operations screens.

6. The screen editing device as claimed in claim 1, wherein the one or more attributes is one or more keywords.

7. The screen editing device as claimed in claim 1, wherein each of the operations screens includes a different application or function, and wherein the screen structural elements having the same attributes are included in a plurality of the different applications or functions.

8. The screen editing device as claimed in claim 1, wherein the editing contents display part is further configured to highlight the selected candidate screen structural element in the automatically displayed operations screen.

9. The screen editing device as claimed in claim 1, wherein the attribute information storing part is further configured to store screen definition data including attribute identification numbers associated with the screen structural elements and to store a plurality of attribute tables, and wherein each attribute table includes a list of the attribute identification numbers common to each attribute table and a list of corresponding attributes written in a different language for each attribute table.

10. A screen editing method for editing multiple operations screens, the screen editing method comprising:

an attribute information storing step of storing one or more attributes for each of screen structural elements arranged on the operations screens, wherein the screen structural elements having the same attributes are arranged on two or more of the operations screens;

a selection receiving step of selecting one of the screen structural elements that is to be edited;

a display setting step of setting whether to display the one of the screen structural elements selected in the selection receiving step on the corresponding operations screens;

an attribute information receiving step of receiving an input of the attribute;

a first extraction step of extracting the screen structural elements with the attribute received by the attribute information receiving step and displaying the extracted screen structural elements as candidate screen structural elements for display-setting in an extract list;

a second extraction step of, by using the one of the screen structural elements selected to be edited from one of the operations screens and selecting a search tab, displaying and designating an initial value of an attribute corresponding to the selected screen structural element as an attribute search input, and a step of selecting screen structural elements corresponding to the initial value of the attribute and displaying the screen structural elements as the candidates of screen structural elements for display-setting in the extract list; and an editing contents display step of, in response to a selection of one of the candidate screen structural elements in the extract list, automatically switching from a currently displayed operations screen, that does not include the selected candidate screen structural element in the extract list, to displaying one of the operations screens that includes the selected candidate screen structural element in the extract list.

11. The image editing method as claimed in claim 10, further comprising:

a display step of displaying a list of the one or more attributes, stored in the attribute information storing step, for each of the screen structural elements arranged on the operations screens being edited, wherein the selection receiving step includes an attribute selection receiving step of selecting the attribute used for extracting the one of the screen structural elements from the list displayed in the display step.

12. The image editing method as claimed in claim 10, wherein, in the attribute information storing step, plural attributes having upper/lower relationships are stored as the attributes for each of the screen structural elements, and the screen structural elements are extracted by using a single or plural and optional level attribute among plural attributes, in the first extraction step.

13. A non-transitory computer-readable storage medium having a program implemented by a computer, the program being used for a screen editing method for editing multiple operations screens, the screen editing method comprising:
- an attribute information storing step of storing one or more attributes for each of screen structural elements arranged on the operations screens, wherein the screen structural elements having the same attributes are arranged on two or more of the operations screens;
- a selection receiving step of selecting one of the screen structural elements that is to be edited;
- a display setting step of setting whether to display the one of the screen structural elements selected in the selection receiving step on the corresponding operations screens;
- an attribute information receiving step of receiving an input of the attribute;
- a first extraction step of extracting the screen structural elements with the attribute received by the attribute information receiving step and displaying the extracted screen structural elements as candidate screen structural elements for display-setting in an extract list;
- a second extraction step of, by using the one of the screen structural elements selected to be edited from one of the operations screens and selecting a search tab, displaying and designating an initial value of an attribute corresponding to the selected screen structural element as an attribute search input, and a step of selecting screen structural elements corresponding to the initial value of the attribute and displaying the screen structural elements as the candidates of screen structural elements for display-setting in the extract list; and
- an editing contents display step of, in response to a selection of one of the candidate screen structural elements in the extract list, automatically switching from a currently displayed operations screen, that does not include the selected candidate screen structural element in the extract list, to displaying one of the operations screens that includes the selected candidate screen structural element in the extract list.

14. The non-transitory computer-readable storage medium as claimed in claim 13,
   wherein the image editing method further includes
   a display step of displaying a list of the one or more attributes, stored in the attribute information storing step, for each of the screen structural elements arranged on the operations screens being edited,
   wherein the selection receiving step includes an attribute selection receiving step of selecting of the attribute used for extracting the one of the screen structural elements from the list displayed in the display step.

15. The non-transitory computer-readable storage medium as claimed in claim 13,
   wherein, in the attribute information storing step, plural attributes having upper/lower relationships are stored as the attributes for each of the screen structural elements, and
   the screen structural elements are extracted by using a single or plural and optional level attribute among plural attributes, in the first extraction step.

* * * * *